US012128616B1

(12) United States Patent
Clark et al.

(10) Patent No.: US 12,128,616 B1
(45) Date of Patent: Oct. 29, 2024

(54) APPARATUS AND METHOD TO FORM AND SHAPE BUILDING CONSTRUCTION MATERIALS

(71) Applicant: Diamond Age 3D, Inc., Phoenix, AZ (US)

(72) Inventors: Paul Clark, Livermore, CA (US);
Philip Mutarelli, Fremont, CA (US);
Adam Hoch, San Jose, CA (US);
Jonathan Reiland, Oakland, CA (US);
Russell Varone, Tempe, AZ (US)

(73) Assignee: Diamond Age 3D, Inc., Phoenix, AZ (US)

( * ) Notice: Subject to any disclaimer, the term of this patent is extended or adjusted under 35 U.S.C. 154(b) by 0 days.

(21) Appl. No.: 17/822,102

(22) Filed: Aug. 24, 2022

Related U.S. Application Data

(60) Provisional application No. 63/236,661, filed on Aug. 24, 2021.

(51) Int. Cl.
| | |
|---|---|
| *B29C 64/00* | (2017.01) |
| *B29C 64/118* | (2017.01) |
| *B29C 64/209* | (2017.01) |
| *B29C 64/214* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B25J 9/16* | (2006.01) |
| *B28B 11/14* | (2006.01) |

(52) U.S. Cl.
CPC .......... *B29C 64/214* (2017.08); *B29C 64/118* (2017.08); *B29C 64/209* (2017.08); *B29C 64/393* (2017.08); *B33Y 10/00* (2014.12); *B33Y 30/00* (2014.12); *B33Y 50/02* (2014.12); *B25J 9/1664* (2013.01); *B28B 11/14* (2013.01)

(58) Field of Classification Search
CPC .............................. B29C 64/214; B33Y 10/00
See application file for complete search history.

(56) References Cited

U.S. PATENT DOCUMENTS

| | | | |
|---|---|---|---|
| 2010/0112119 A1* | 5/2010 | Khoshnevis | ............ B29C 48/06 425/432 |
| 2019/0009472 A1 | 1/2019 | Mark | |
| 2019/0368189 A1* | 12/2019 | Joze | ...................... B28C 5/1253 |
| 2020/0324356 A1* | 10/2020 | Yamasaki | ............... B22F 12/41 |
| 2022/0097255 A1* | 3/2022 | Lind | ..................... B33Y 30/00 |
| 2023/0055418 A1* | 2/2023 | Wu | ........................ B33Y 10/00 |

* cited by examiner

*Primary Examiner* — Nicholas R Krasnow
(74) *Attorney, Agent, or Firm* — Cooley LLP

(57) ABSTRACT

An apparatus has a carrier robot operative within a working volume. A forming mechanism is mounted to the carrier robot. A unitary controller supplies control signals to the carrier robot and the forming mechanism, such that the carrier robot implements mechanical motion along a deposition vector and the forming mechanism deposits a segment of structured material onto a build surface within the working volume.

5 Claims, 29 Drawing Sheets

APPARATUS AND METHOD TO FORM AND SHAPE BUILDING CONSTRUCTION MATERIALS

This application claims priority to U.S. Provisional Patent Application No. 63/236,661, filed Aug. 24, 2021, the contents of which are incorporated herein by reference.

FIELD OF THE INVENTION

The present invention relates generally to a means and method of precisely forming and depositing high-viscosity construction materials according to a digitized layout utilizing a numeric-controlled robotic system.

DESCRIPTION OF BACKGROUND ART

There is an increasing use of computer numeric controlled (CNC) or robotic systems to build various structures by material deposition. Such systems are referred to as three-dimensional printing or 3D printing. In recent years, the scale and application of such systems has expanded into the construction field, enabling the use of 3D printers to rapidly create inhabitable self-supporting structures using a minimum of manual labor.

Current examples of such systems are typically derived from smaller-scale fused deposition modelling (FDM) printers, where the plastic material substrate is melted through an applicator nozzle before being extruded as a semi-liquid onto a build surface. Adapting this technology to structural engineering has demanded a progression in substrate material, with concrete being a known and trusted answer in most engineering applications.

Accordingly, conventional structural 3D printing systems typically use a low-viscosity mixture of pseudo-concrete pumped on top of a build surface. It is noted that the 'concrete' used in this application lacks the large diameter 'coarse' aggregate that lends poured concrete much of the finished strength relied upon by structural engineers. In fact, due to the requisite pumpability of the pseudo-concrete used in conventional 3D construction systems, the pseudo-concrete also lacks much of the 'fine' aggregate (sand, fly ash, etc.) typically used in poured concrete. The admixtures used in most conventional printing applications are more consistently similar to mortar than structural concrete.

State of the art 3D printing construction systems attempt to simulate a mass-poured concrete wall structure, where the concrete is a continuous mass from foundation to roof line. Emulating a singular mass of concrete requires close control of layer-to-layer adhesion. Layer adhesion is necessarily a mechanical and chemical bond that intimately connects the two separate structures so that under structural loads the individual layers perform as one contiguous body. Several parameters must be controlled to achieve the desired adhesion, such as contact force (the downward pressure applied to the flowing material so that it grafts onto the layer below it). To achieve contact force, typical systems use a 'nozzle' that is a vertically oriented free-flow device with a fixed aperture profile (conical, rectangular, round, etc.).

Vertically oriented nozzles have a completely open nature, where the nozzle is not touching the base, foundation, or substrate material that the nozzle is building upon. This can be considered as a 'stand-off distance', and for 3D printing systems this value is closely related to layer height. FIG. 1 illustrates a horizontal arrow characterizing the deposition direction and a vertical arrow characterizing the material extrusion path. The deposited material protrudes forward in front of the exit aperture. In contrast, in FIG. 2, the deposited material pulls away from the lowest edge of the nozzle without material deposition in front of the exit aperture.

The need to run a significant standoff distance creates a significant gap where the extruded material is unconstrained. The unconstrained flow makes shape control and material placement a challenge, leading to lack of uniformity of layer width, thickness, and appearance. This can be characterized as an 'unconstrained' application method, in contrast to some horizontally oriented systems.

Horizontal nozzles form material parallel to the direction of flow, but typically do not have a closed 'bottom' surface. The lack of bottom surface (surface closest to and parallel to the substrate being built upon) is driven by the need to press material down onto the previous layer or substrate, aiming to achieve some level of mechanical adhesion in the process. Typically, this will be achieved by having an undercut bottom surface of a shaping aperture, where the lower edge of the nozzle is some distance preceding the upper edge. This allows material to exit the orifice with some vertical travel vector, thus not being a purely horizontal application means. FIG. 3 illustrates a horizontal cut out 300 at the exit aperture.

The use of conventional concrete admixtures, or any mixture approaching parity, is not possible with conventional systems. These materials have high viscosity and are not able to be pumped by traditional methods, leaving real concrete beyond the capabilities of conventional 3D printing construction systems.

Thus, there is a need to address deficiencies associated with prior art systems.

SUMMARY

An apparatus has a carrier robot operative within a working volume. A forming mechanism is mounted to the carrier robot. A unitary controller supplies control signals to the carrier robot and the forming mechanism, such that the carrier robot implements mechanical motion along a deposition vector and the forming mechanism deposits a segment of structured material onto a build surface within the working volume.

DETAILED DESCRIPTION

Figure 1:
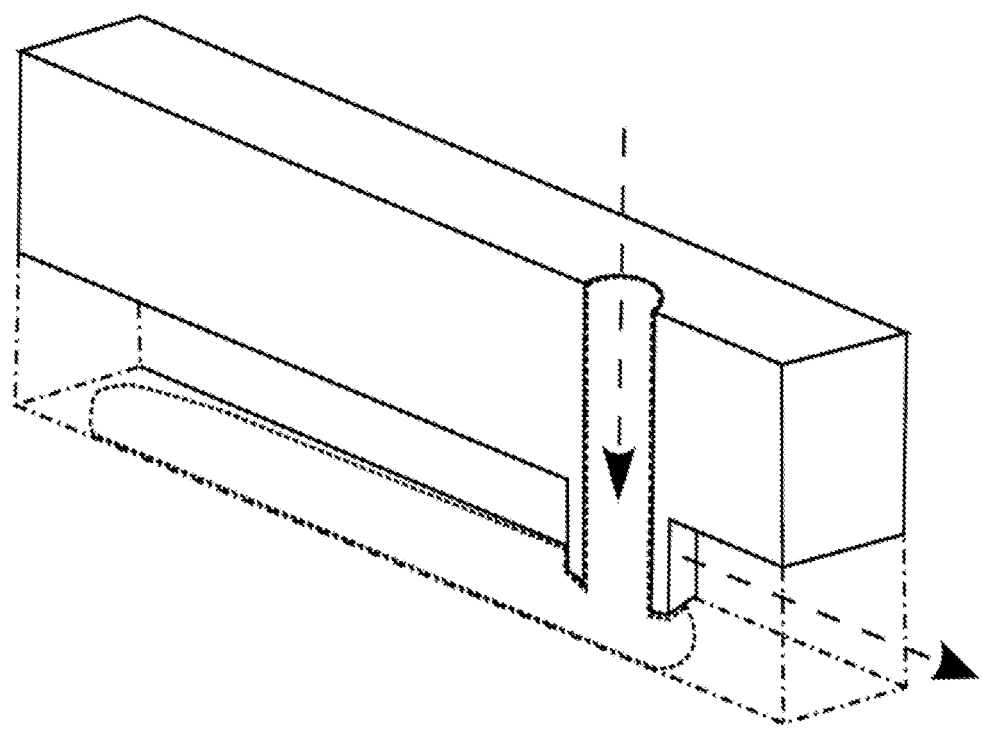
FIG. 1 is a simplified schematic view of the positional relationship between a deposition system and a build plane.
Figure 2:
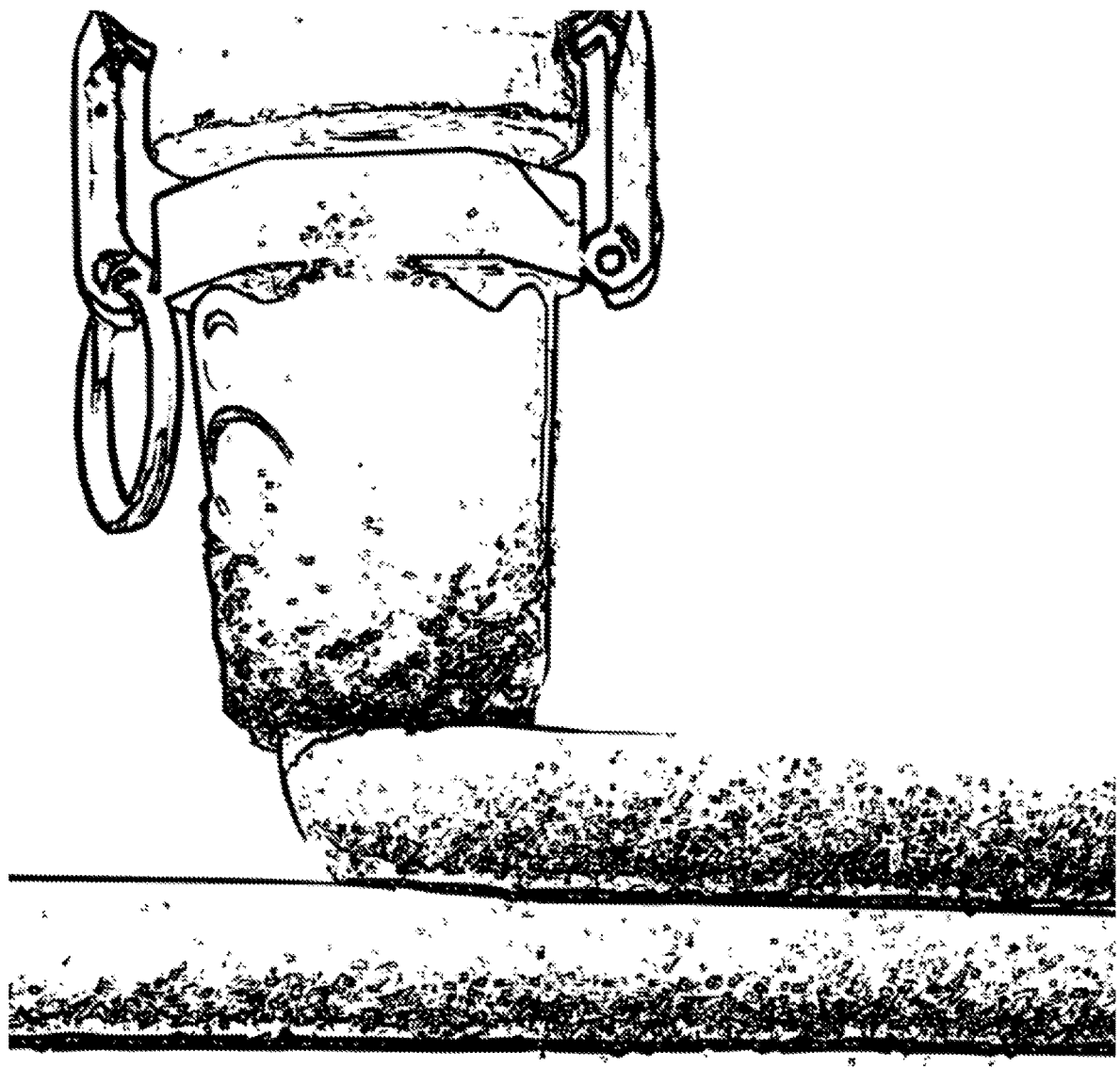
FIG. 2 is a side-elevational view of a conventional vertical extrusion head applying an unformed build layer of construction material.
Figure 3:
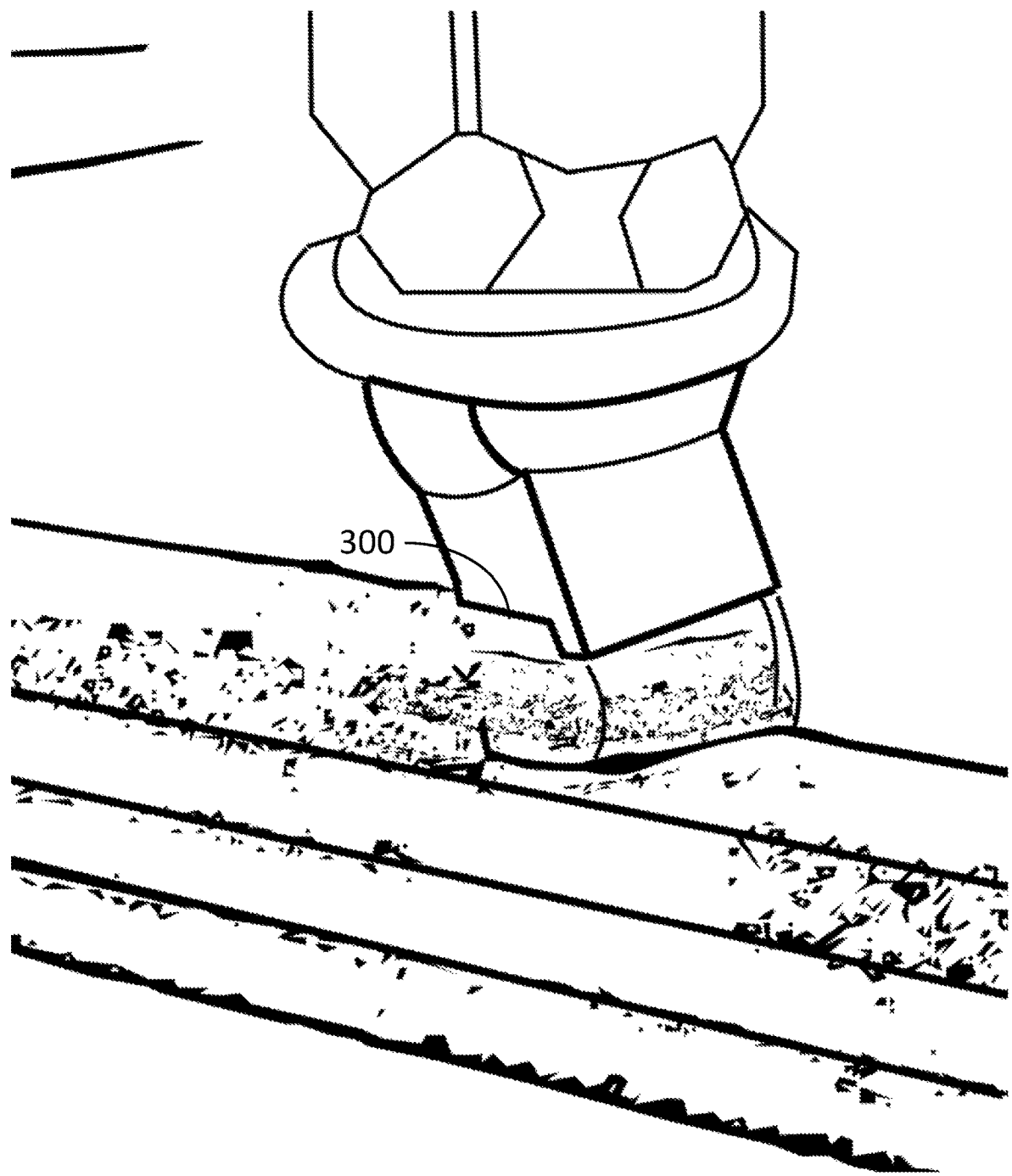
FIG. 3 is a side-elevational view of a conventional horizontal extrusion head applying a build layer of construction material utilizing a downward extrusion force to promote layer adhesion.
Figure 4:
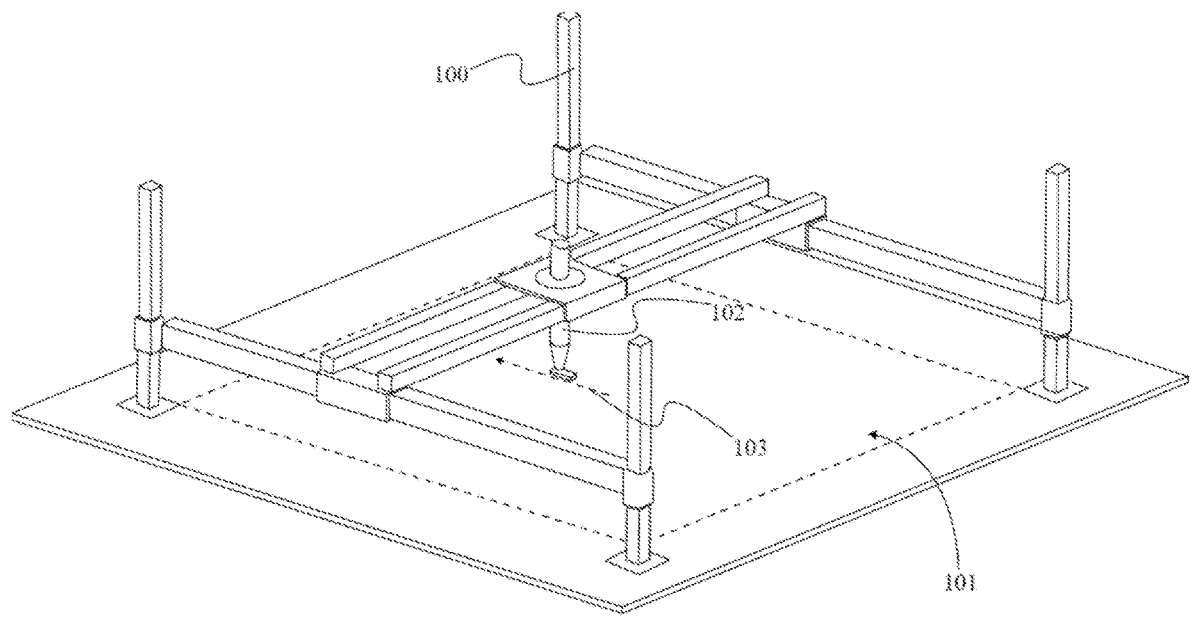
FIG. 4 is a perspective view of a modified Cartesian robot system adapted for use as a component of the present invention.

In reference to FIG. 4, the present invention comprises a carrier robot 100 operative within a working volume 101 such that the carrier robot 100 may displace or relocate a forming mechanism 102 to anywhere within the working volume 101. This relocation is ideally achieved through mechanical motion controlled by a computerized-numerical-control (CNC) gantry system, or an analog thereof, such that the position of the forming mechanism 102 within the working volume 101 is digitally moderated. Likewise, the forming mechanism 102 is operative along a deposition vector 103 defined by the azimuth and heading of the forming mechanism 102 within the working volume 101.

Figure 5:
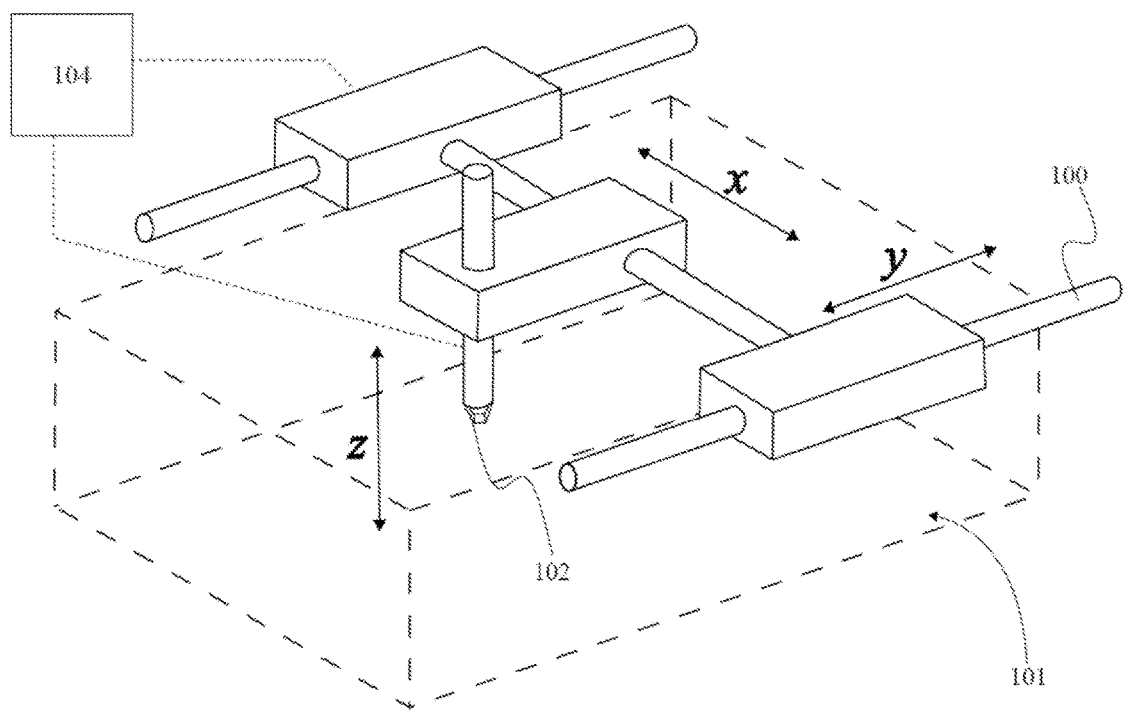
FIG. 5 is a perspective view of a generic rectilinear three-axis Cartesian robot system.

FIG. 5 illustrates a conventional rectilinear mechanism operable within three axes of motion, i.e., a Cartesian system. In this embodiment, the carrier robot 100 moves the forming mechanism 102 at precise speed and direction through use of signals from a unitary controller 104, which directs the mechanical motion pathing via instruction in the X, Y, & Z directions as shown. This type of system is presented as a preferred embodiment of the carrier robot 100, wherein the exemplary forming mechanism 102 is mounted to the carrier robot 100 to execute a controlled construction process within the working volume 101. This embodiment is not intended to limit the application of the present invention to this variant of macro-scale tool handling or indicate that the proposed method cannot be executed using alternate embodiments thereof. Various means of transporting the forming mechanism 102, including articulated robots, Cartesian robots, Selective Compliance Articulated Robot Arm (SCARA), cylindrical robots, delta-type, polar-type, or other manifestations of CNC systems may be employed in this role without departing from the original spirit and scope of the present invention.

Figure 6:
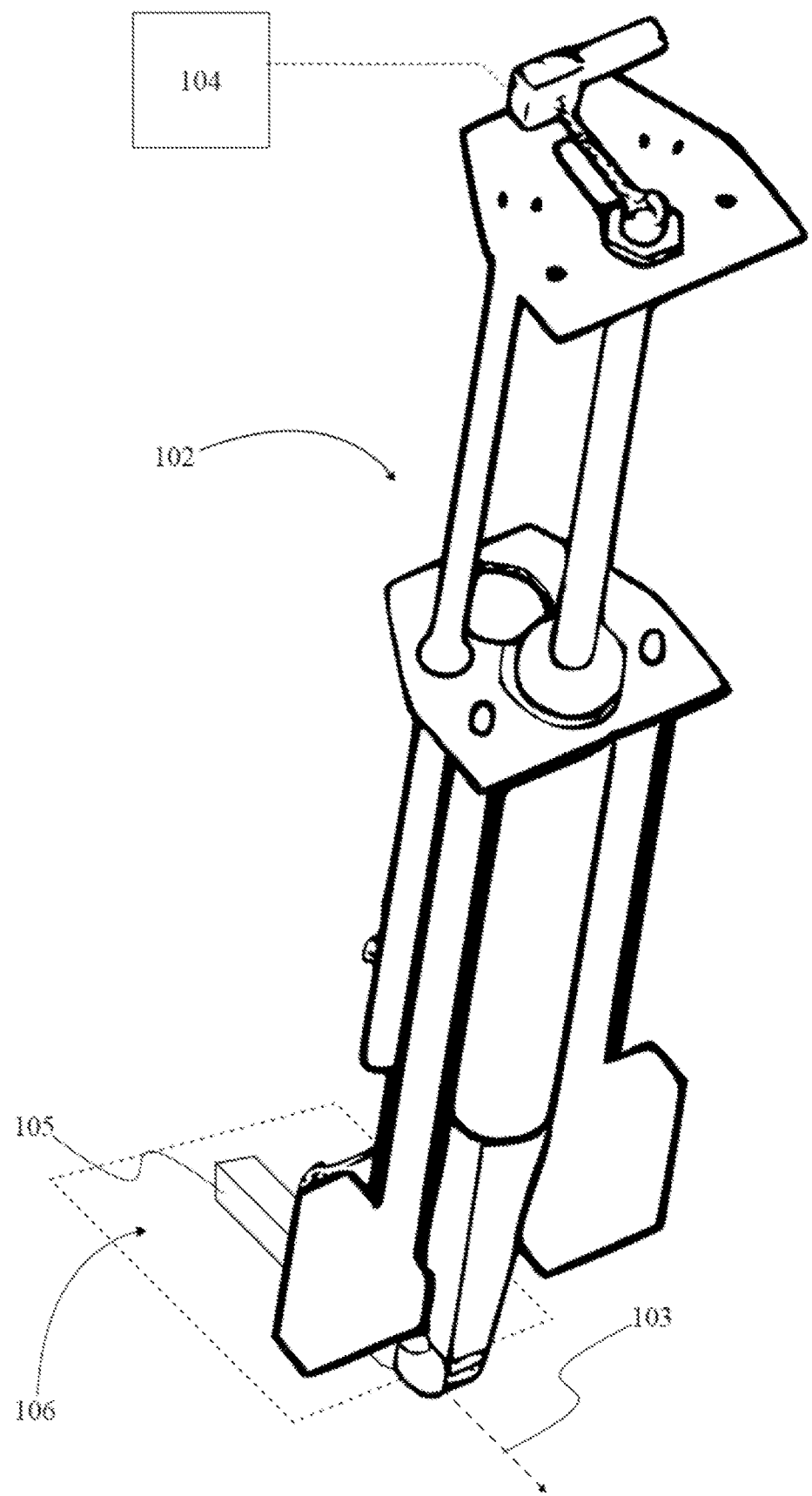
FIG. 6 is a top-perspective view of a preferred embodiment of the forming drive mechanism, specifically comprising a dual-drive rod forming pump.

FIG. 6 presents a preferred embodiment of said forming mechanism 102, configured as a modular attachment for the carrier robot 100. As indicated, the forming mechanism 102 constitutes a self-contained means of pressurizing, forming, directing, and extruding construction materials in a controlled manner according to digital commands. It is generally proposed that the present invention offers a significant advantage over present systems in that it is able to process high-viscosity materials such as low-slump concrete. Such high-viscosity mixtures are more likely to hold a desired as-formed shape and stand taller at unsupported heights, with less shape loss due to sagging, slumping, and settling. Further, the use of more structurally 'static' materials enables the segment of structured material 105 to present a smoother finished surface without additional post-processing.

These disparate systems for mechanical motion and material-handling are integrated into a coherent motion and extrusion system by the unitary controller 104 supplying control signals to the carrier robot 100 and the forming mechanism 102 in tandem. More specifically, the unitary controller 104 is configured to unify the mechanical motion of the carrier robot 100 with the operation of the forming mechanism 102 to selectably deposit construction materials within the working volume 101. In one instance, the unitary controller 104 directs the forming mechanism 102 to deposit or extrude a segment of structured material 105 into the working volume 101 as the carrier robot 100 displaces the forming mechanism 102 along the deposition vector 103, thereby targeting the segment of structured material 105 onto a selected build surface 106. This is achieved by moderating the extrusion rate and the displacement rate in concert to avoid excess material buildup at any single point (due to over-extrusion and under-displacement) or material dislocation along the deposition vector 103 (under-extrusion and over-displacement).

Figure 7:
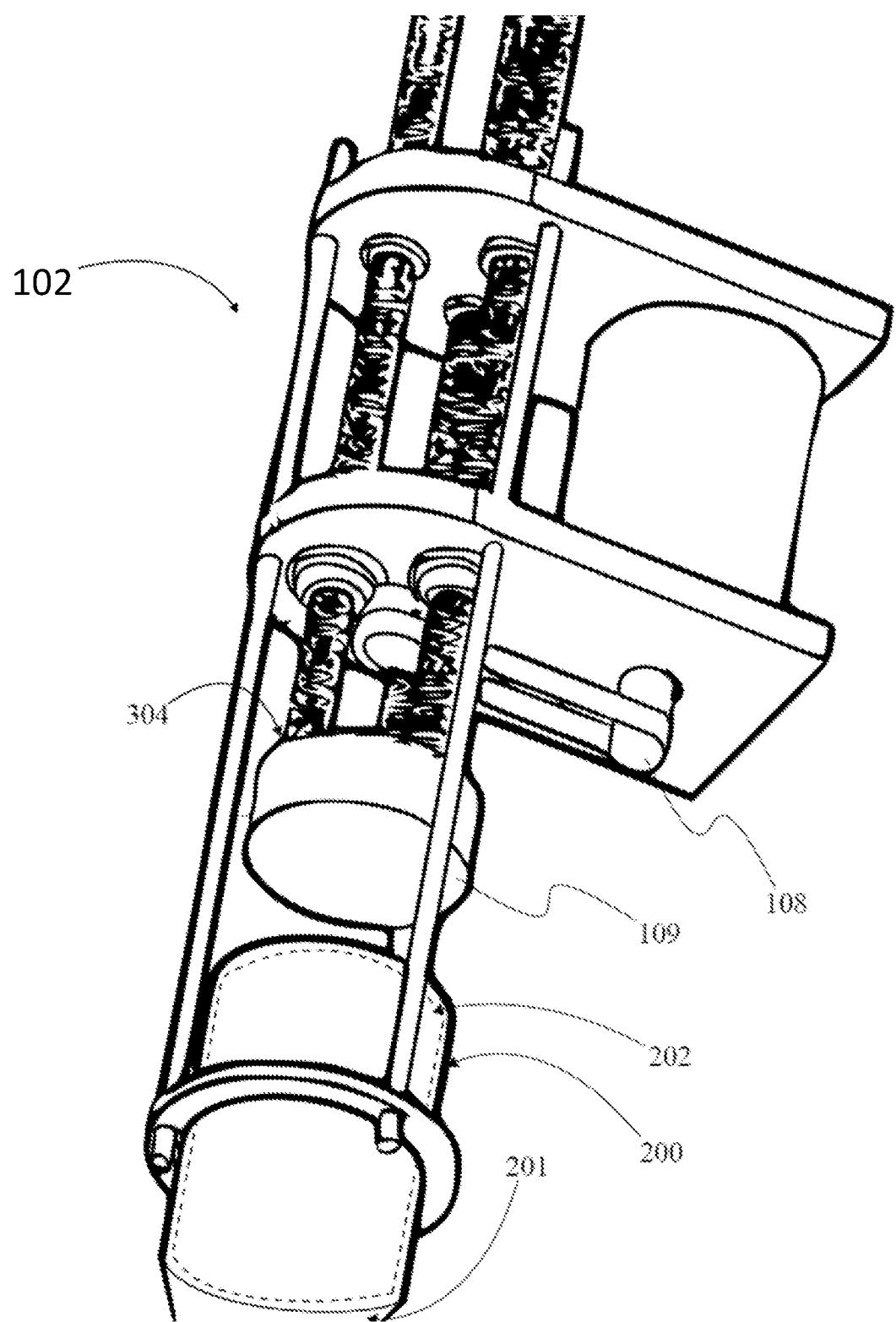
FIG. 7 is a bottom perspective view of a preferred embodiment of an extrusion mechanism, specifically comprising a triple ball screw extrusion system.
Figure 8:
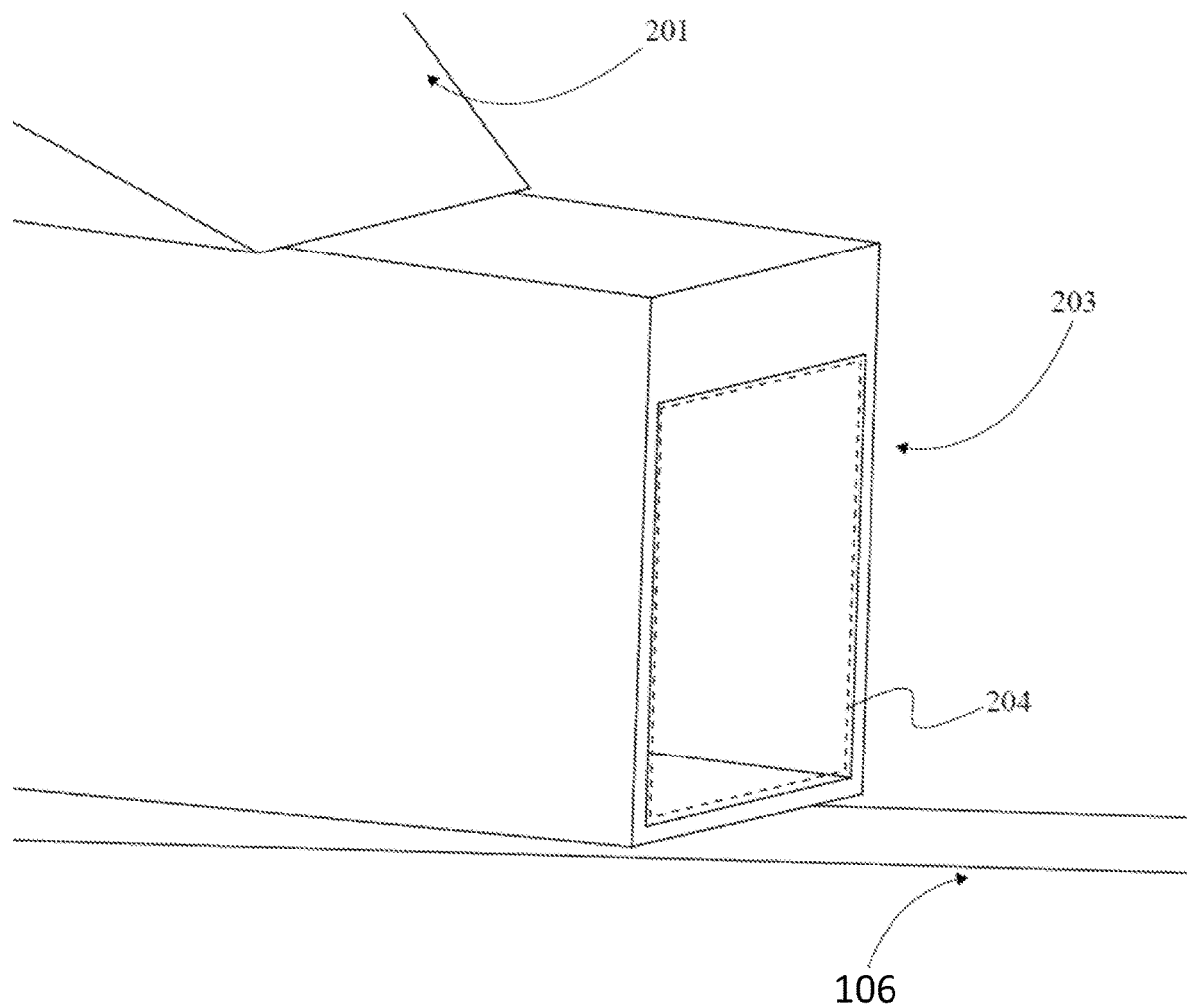
FIG. 8 is an elevational view of a preferred embodiment of the axial applied shaping system, where a constrained instance of an exit aperture is shown.

In further reference to FIGS. 7 and 8, the forming mechanism 102 further comprises at least one actuator 108, a piston 109, a compression zone 200, and a sizing zone 201. The illustrated arrangement enables the controlled formation of generic high-viscosity construction materials (e.g., concrete) into self-supporting structures without relying on a chemical bond between subsequent build layers. Instead, the forming mechanism 102 is configured to produce precompressed, uniform build-layers comprised of multiple superposed instances of the segment of structured material 105.

The at least one actuator 108 broadly refers to any means or mechanism utilized to propel a volume of unstructured material 202 from the compression zone 200 into the sizing zone 201. Such embodiments, include, but are not limited to, hydraulic cylinders, ball screw actuators, roller screw actuators, compressed air or fluids, or any number of devices which provide for controlled linear motion to axially drive the piston 109 into the compression zone 200.

Accordingly, the piston 109 is mounted to the terminal end 304 of the at least one actuator 108, sealed to the inner diameter of the sizing zone 201, and advanced into the volume of unstructured material 202. Advancing the piston 109 into the compression zone 200 (at nominal pressure) forces the volume of unstructured material 202 into the sizing zone 201 under increased pressure. Ideally, this arrangement leverages the flow restriction of the sizing zone 201 to ensure that the volume of unstructured material 202 displaces any voids within the sizing zone 201 as the pressure increases. Ultimately, the volume of unstructured material 202 adopts the dimensions of the sizing zone 201 and is expelled from the sizing zone 201 via a terminally positioned exit aperture 203.

Figure 9:
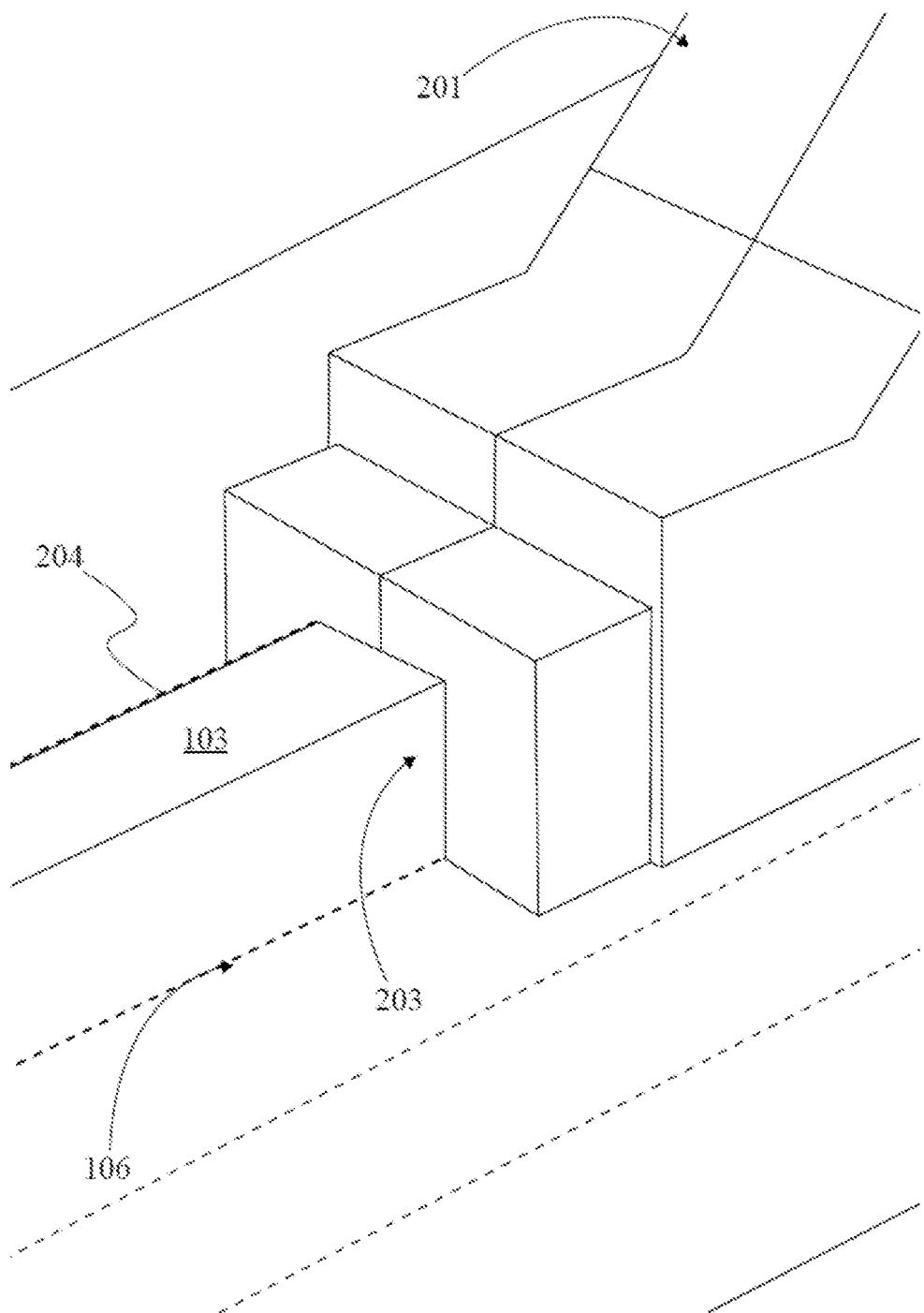
FIG. 9 is a perspective view of an axial applied shaping system dispensing a constrained, geometrically consistent build layer of construction material.

The exit aperture 203 defines the output of a progressively sculpted extruder-assembly configured to form and convert the volume of unstructured material 202 into the segment of structured material 105 based on the interior geometry of the exit aperture 203. The exit aperture 203 is used to define the dimensions of the segment of structured material 105 as a continuous slip-form element, enabling a contiguous instance of the segment of structured material 105 to be expelled from the sizing zone 201 according to the operation of the at least one actuator 108, i.e., dependent upon the pressurization of the compression zone 200. This controllable forming arrangement ensures that the volume of structured material retains a consistent finished profile 204, thereby enabling an operator to reliably plan the assembly of a standing structure based on repeated, vertically stacked extrusions of the segment of structured material 105 as shown in FIG. 9.

In a preferred embodiment, the forming device constitutes a rigid tubular conduit with an internal diameter ranging from 1.5 inches up to 20 inches, and lengths from 24 inches up to 288 inches, according to the desired maximal output volume and dependent upon the needs of the operator. It is further considered that the dimensions of the forming device may be adapted according to the desired volume of construction material required during each cyclical execution of a 'build' function, and adapted to the working limits (i.e., set-times, cure-rates, etc.) of the construction materials being used in any iteration of the proposed process.

Likewise, the force exerted on the piston 109 is moderated to a targeted rate such that the volumetric displacement of the volume of unstructured material 202 inside the compression zone 200 is equal to the volumetric output desired from the forming mechanism 102 during a single build operation. For example, the advance-rate of the piston 109 may be delayed, reducing the output volume over a given time frame. Alternately, the rate may be accelerated to increase the output volume, dependent upon the instructions executed by at least one actuator 108. Further, the ratio of the surface area of the piston 109 relative to the exit aperture 203 defines a compression ratio of any given embodiment of the forming mechanism 102. The compression ratio is employed as a control factor in synchronizing movements of the piston 109 to movements of the carrier robot 100 along the deposition vector 103, limiting the maximum draw-speed of the carrier robot 100 according to the maximum output-rate of the forming mechanism 102.

Figure 10:
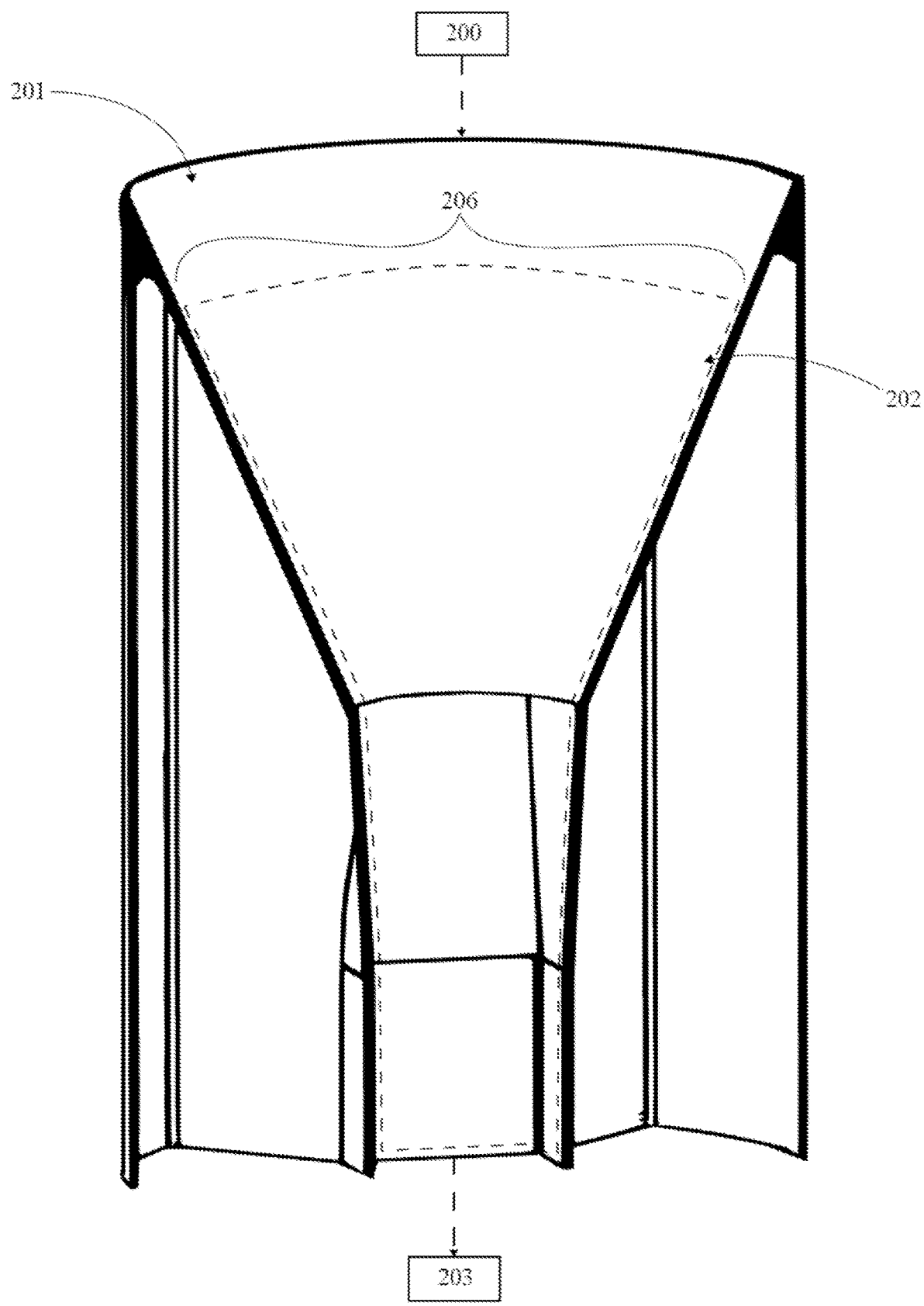
FIG. 10 is an elevational view of a compression die, where a lateral section view is taken between the die entry and die exit.

In reference to FIG. 10, the forming mechanism 102 additionally constitutes a means of profile-shaping that relies on a progressive reduction of a cross-sectional dimension 206 of the sizing zone 201 between the compression zone 200 and the exit aperture 203. Material compression is achieved by moving the volume of unstructured material 202 under pressure through a tapered die that circumferentially constrains the material on all sides except for the face proximal to the exit aperture 203. The cross-sectional area reduction of the sizing zone 201 gradually forms the volume of unstructured material 202 as it moves along a flow path defined axially between the compression zone 200 and the exit aperture 203. Shaping the construction material inside the sizing zone 201, rather than post-extrusion, enables calibration of the finished profile 204 via analog recontouring of the sizing zone 201. Further, the compaction, consolidation, and smoothing of the material is observed to enhance physical properties as voids are displaced from the segment of structured material 105 while simultaneously improving aesthetic appearance.

This is generally proposed as a robust system for yielding the segment of structured material 105 with controllable dimensions, provided that the contours and compression-ratio of the sizing zone 201 are adjusted appropriately. In testable use-cases, reduction in cross sectional area ranges from 1.5:1 upwards to 20:1, dependent upon the type of material utilized or the desired final compression of the segment of structured material 105.

Figure 11:
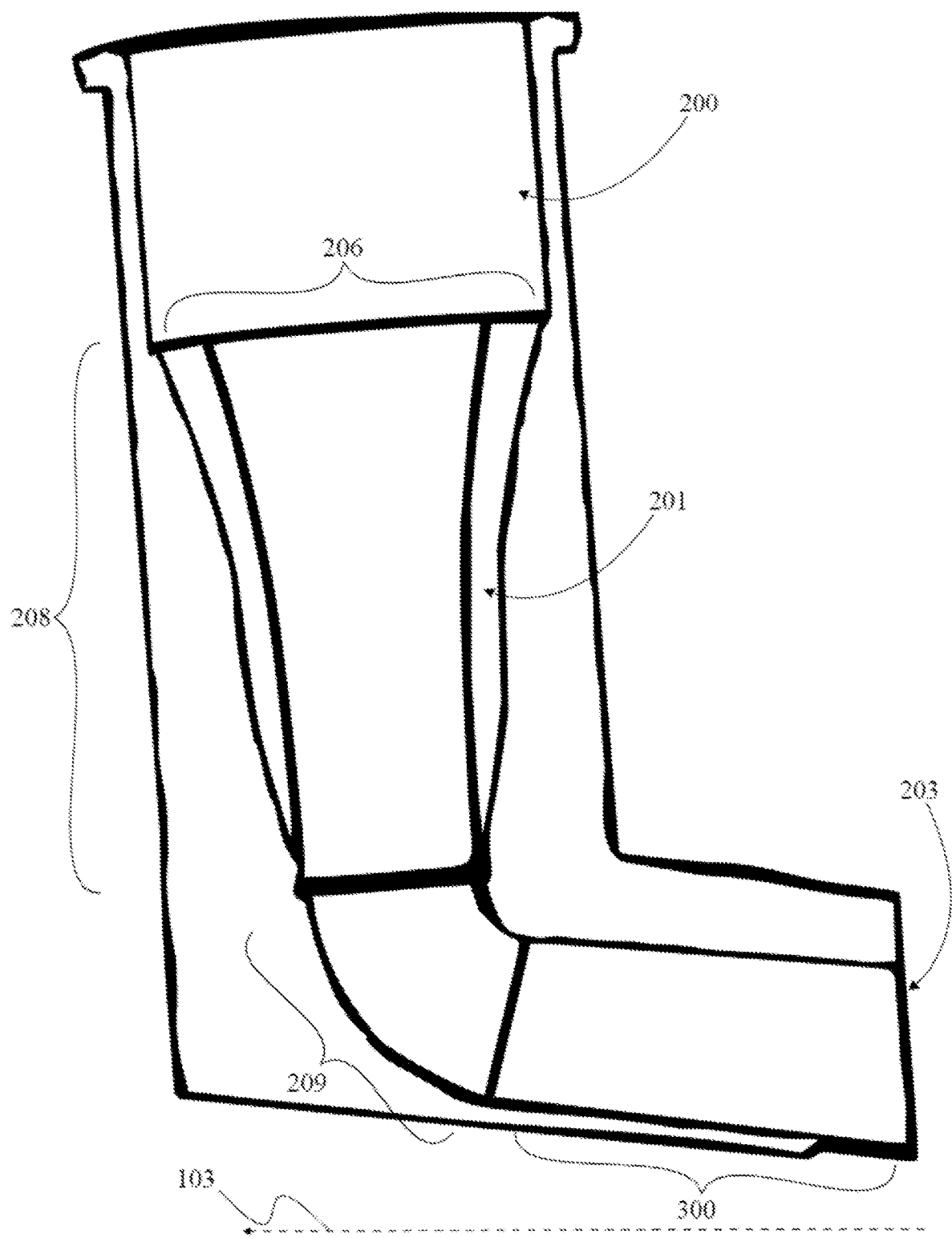
FIG. 11 is an alternate embodiment of a compression die with a direction change zone and exit aperture.

Referring to FIG. 11, it is further proposed that the sizing zone 201 comprises a vertical conduit 208, a deviated conduit 209, and a horizontal conduit 300 to enable the directed axial extrusion of the segment of structured material 105 along a roughly parallel axis to the deposition vector 103. The resultant orthogonal alignment of the exit aperture 203 to the deposition vector 103 enables the extrusion of material with no appreciable downward force, avoiding deformation due to unconstrained application as is seen with conventional vertically oriented printer systems.

Figure 12:
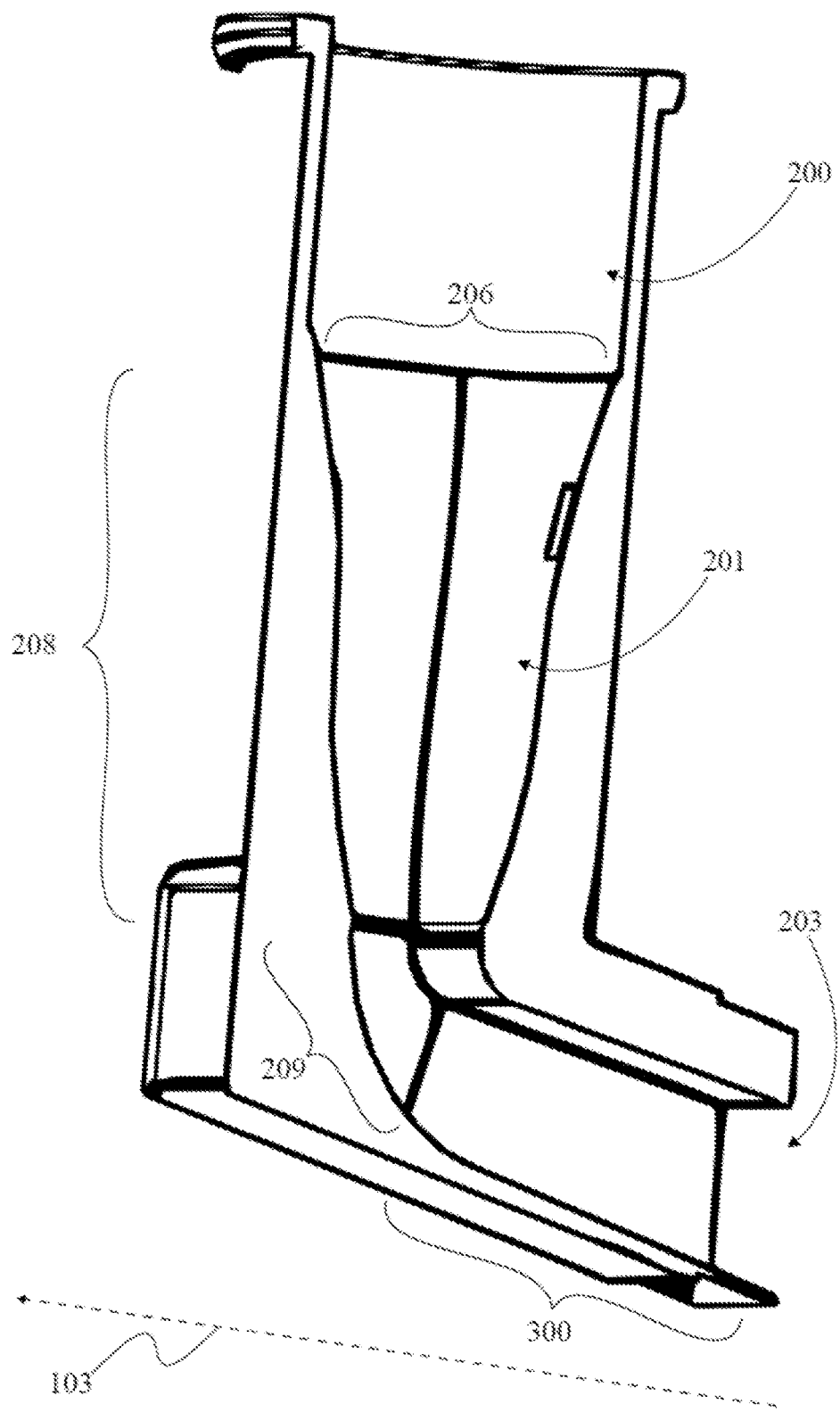
FIG. 12 is an alternate perspective view of a compression die where the die exit profile is emphasized.
Figure 13:
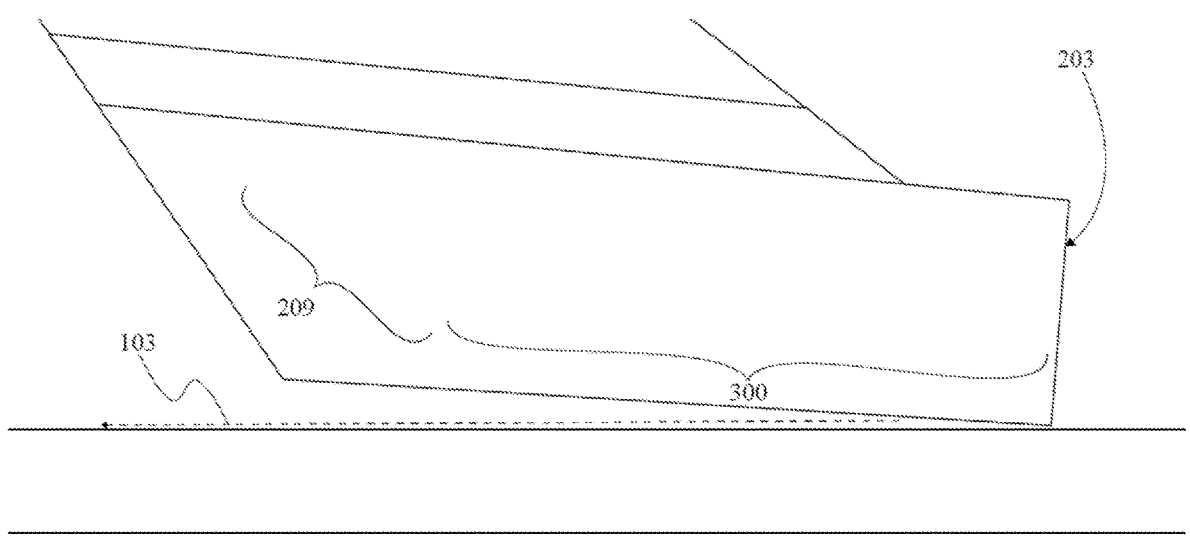
FIG. 13 is an elevational view of a compression die.

In reference to FIG. 12, it is further considered that the exit aperture 203 may be canted towards or away from the selected build surface 106 to minimize momentum-based deformation by reducing the deflection angle between the exit aperture 203 and the deposition vector 103. The basis of this angle is defined by the degree of deviation achieved between the vertical conduit 208 and the horizontal conduit 300 across the deviated conduit 209, where the deviated conduit 209 constitutes a direction-change in the axial flow of construction material through the sizing zone 201. This arrangement enables the volume of unstructured material 202 to naturally 'settle' downwards through the vertical conduit 208, while still providing an optimum orientation of the exit aperture 203 along the horizontal conduit 300 as shown in FIG. 13. Additionally, it is considered that the final angle between the exit aperture 203 and the deposition vector 103 may also be adjusted by manipulating the position of the forming mechanism 102 within the working volume 101 using the carrier robot 100.

Further, it is proposed that the extrusion of the segment of structured material 105 in an axial direction enables the present invention to 'push' material into corners and abut material up against other vertical surfaces, ensuring intimate contact with other structures. Provided with an appropriate deposition vector 103, this functionality enables the present invention to laterally bridge small gaps in the selected build surface 106 that would not be accessible by a conventional vertical approach. Additionally, the lateral projection of the segment of structured material 105 may be directed into (or onto) an existing vertical structure to 'key' into a seamless joint between the existing structure and the selected build surface 106 with a single pass of the forming mechanism 102.

To ensure accurate, deformation-free cutting of the segment of structured material 105, the present invention provides a material cutter 207 inside of the sizing zone 201. By positioning the cutting action inside of a constricted area, i.e., the sizing zone 201, the present invention prevents the deformation of the finished profile 204 due to the operation of the material cutter 207. More specifically, the segment of structured material 105 is constrained on all lateral sides to ensure that the finished profile 204 does not deform or displace significantly when acted on by at least one blade 302. This allows for a 'clean' cut, with no significant change to height or width of the finished profile 204.

Figure 14:
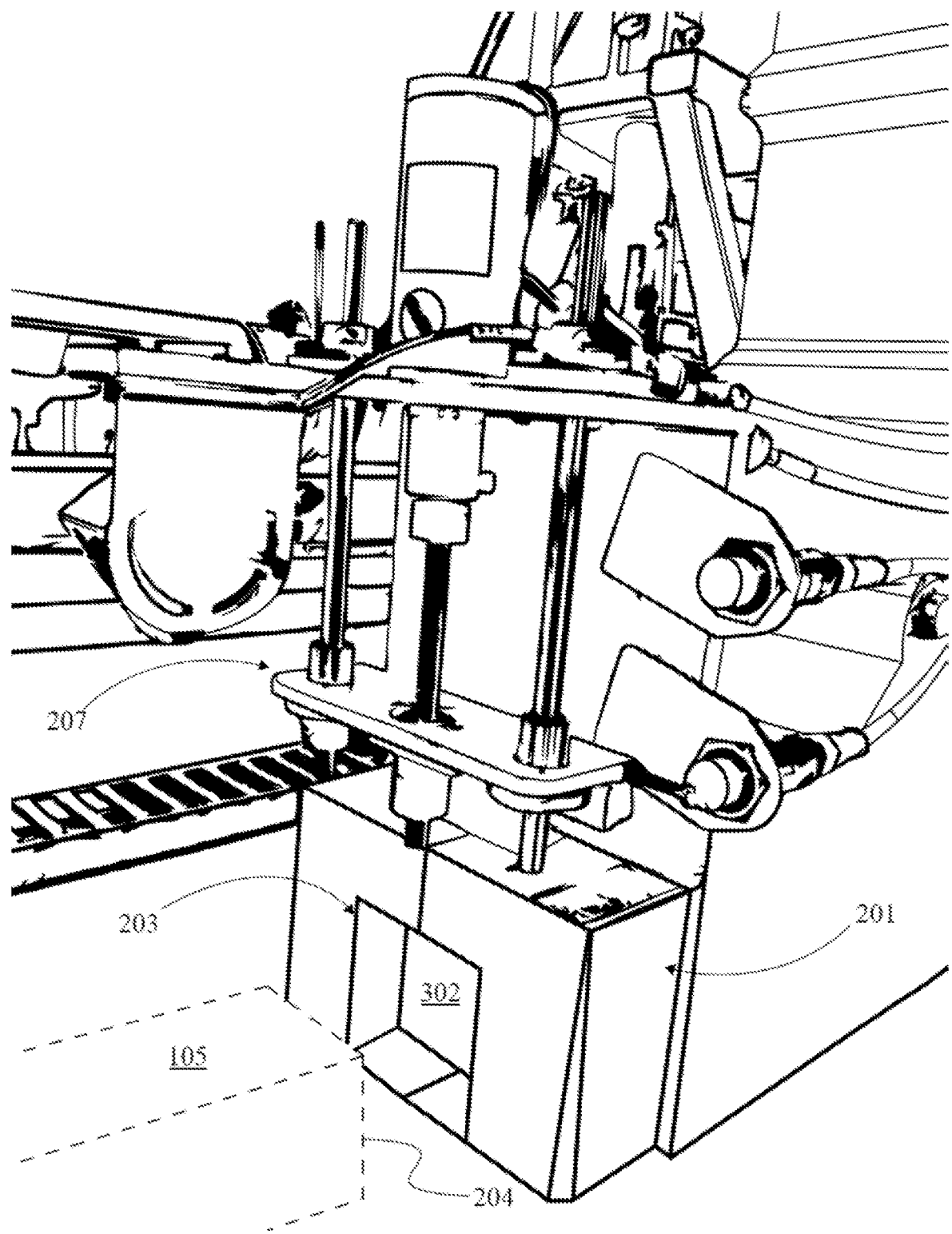
FIG. 14 is a perspective view of a cutting gate mechanism.

In another embodiment, the blade 302 of the material cutter 207 is offset from the exit aperture 203 within the sizing zone 201 as shown in an exemplary form in FIG. 14. This arrangement ensures that a terminal end 304 of the segment of structured material 105 remains within the sizing zone 201 even as the blade 302 traverses the sizing zone 201, thereby ensuring that the segment of structured material 105 is fully supported on both sides of the cut. With a small length of the segment of structured material 105 remaining inside the sizing zone 201 post-cut, the carrier robot 100 is displaced along the deposition vector 103 to place the terminal end 304 onto the selected build surface 106 precisely according to a building plan. Additionally, the sheer surface of the terminal end 304 enables the creating of smooth, targeted butt-joints to later printed segments. This is not typically achievable using conventional printer systems, as the terminal facets and formations tend to collapse without an immediately adjacent structure in support.

Figure 15:
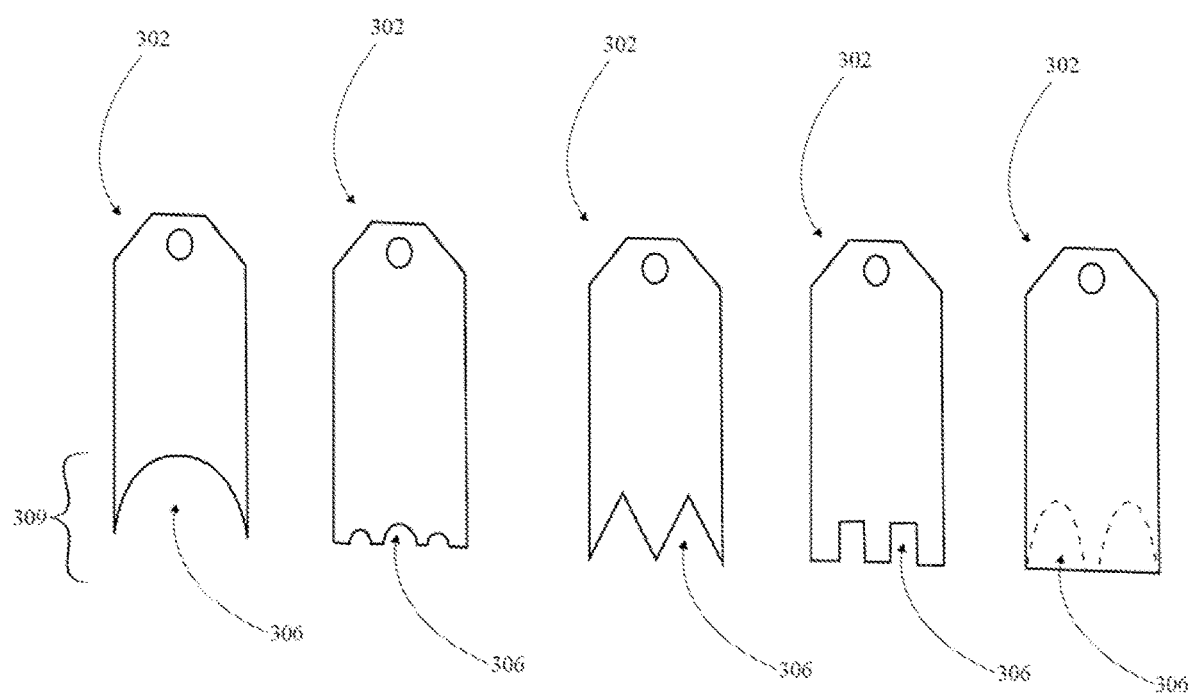
FIG. 15 is an elevational view of a plurality of exemplary alternate embodiments of the cutting blade.

The blade 302 used to separate the material may be made of any material suitable for cutting the construction material, including steel, aluminum, fiberglass, ceramic, carbon fiber, or other suitable embodiments according to the type of construction material being used. It is further proposed that the shape of the blade 302 may be tailored to create functional formations in the terminal end 304 of the segment of structured material 105, with several exemplary embodiments shown in FIG. 15. More specifically, it is proposed that at least one cutting element 309 of the blade 302 defines a non-planar formation 306, wherein the distortions of the cutting element 309 are configured to improve the finished quality of the terminal end 304.

Figure 16:
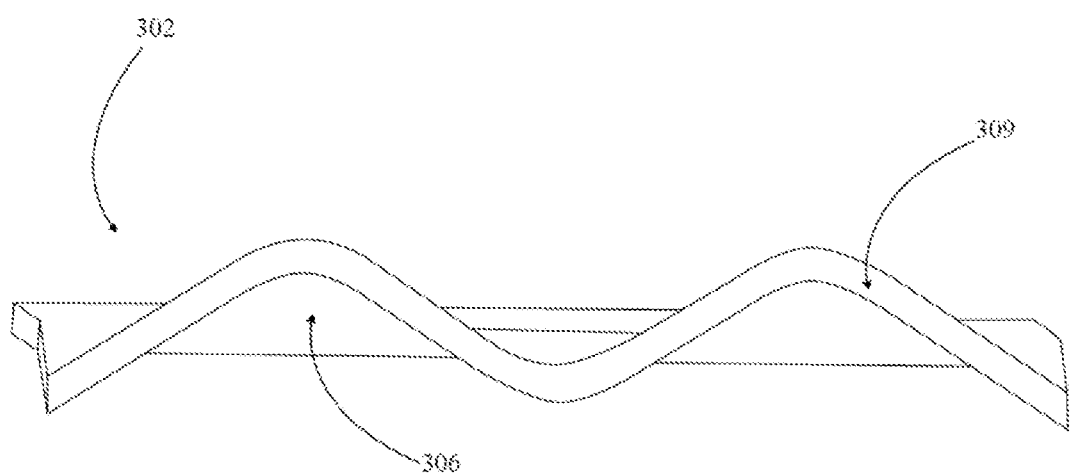
FIG. 16 is a bottom plan view of a cutting blade.

In one instance, the non-planar formation 306 defines a lateral 'wave' pattern as shown in FIG. 16, wherein the waves taper into a flat formation along the blade 302. This embodiment optimizes the structure of the blade 302 as a secondary forming element, wherein the portions of the construction material trapped in the hollows of the wave are forcibly reformed into the terminal end 304 as the blade 302 proceeds across the sizing zone 201.

In another embodiment, the non-planar formation 306 constitutes an irregular serration pattern suitable for displacing any non-severable additives in the segment of structured material 105 (e.g., aggregate, fiber), or otherwise improving the capacity of the blade 302 to cut the construction material. In another application, the non-planar formation 306 may be employed as troweling tools to affect the finished profile 204 by partially or periodically obstructing the exit aperture 203, thereby creating a negative of the non-planar formation 306 in the finished profile 204. This functionality may be employed to create interlocking or otherwise compatibilized features on the segment of structured material 105. For example, one instance of the blade 302 may be partially positioned across the exit aperture 203 to create a 'key' feature on the upper facet of the segment of structured material 105, thereby enabling a subsequent segment to interlock to such a feature. Further, the non-planar formation 306 may be distributed across the segment of structured material 105 to deliberately expose additional surface area to aid adhesion of subsequent construction materials.

Figure 17:
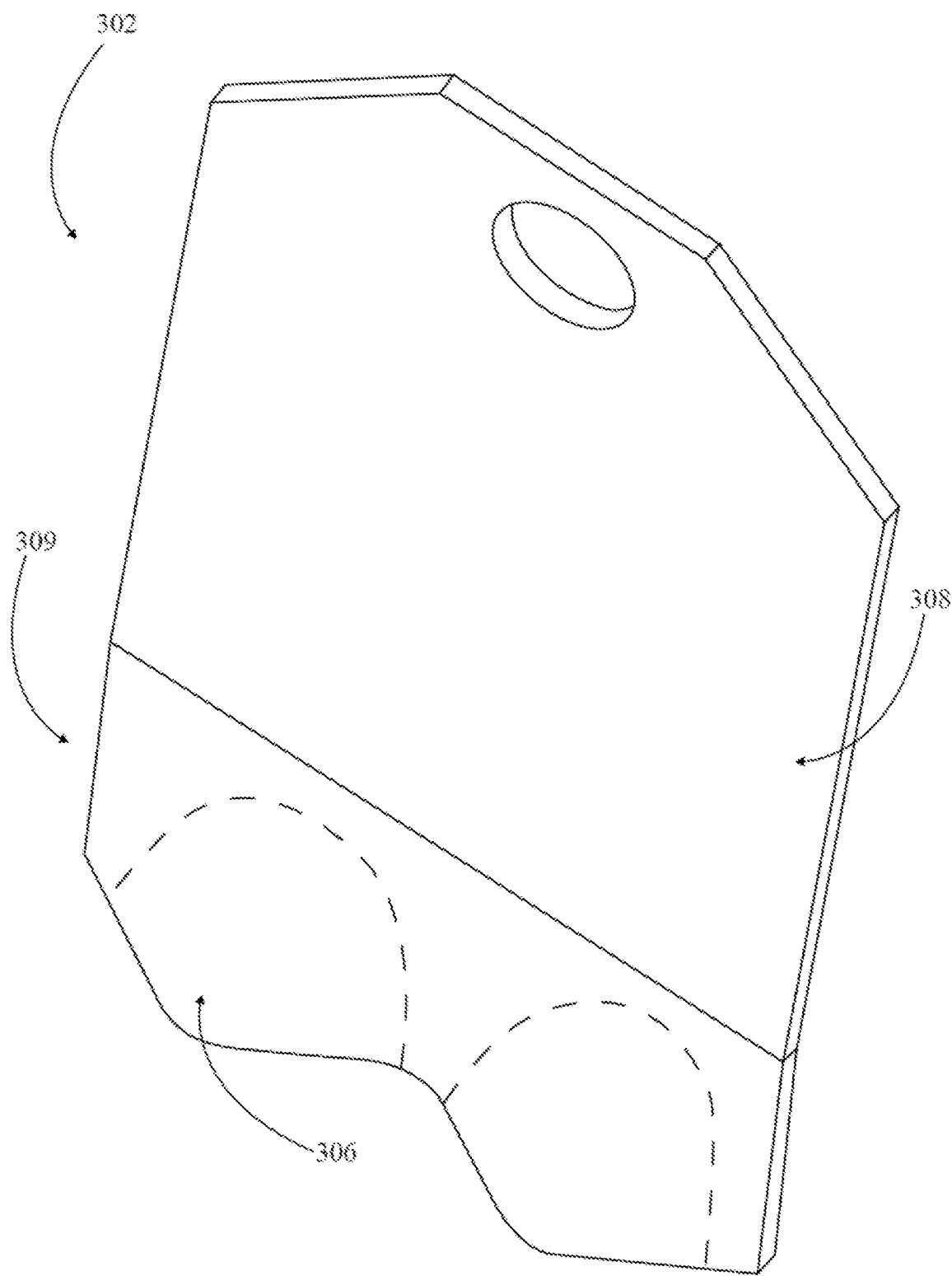
FIG. 17 is a perspective view of a cutting blade, where the cutting blade is configured with lateral undulations.

In addition to the cutting functionalities described above, the blade 302 also provides an operable printing 'brake' configured to enable the forming mechanism 102 to displace within the working volume 101 without leaking construction material from the exit aperture 203 or depressurizing the volume of unstructured material 202. Accordingly, the blade 302 comprises a sluice 308 and at least one cutting element 309 as indicated in FIG. 17. The sluice 308 is slidably engaged into a cutting channel 400 within the sizing zone 201 such that the sluice 308 operably closes the exit aperture 203 by fully blocking the sizing zone 201. This is aptly described as a 'closed' configuration that is naturally achieved as the at least one cutting element 309 is drawn across the sizing zone 201 to sever the segment of structural material within the sizing zone 201.

Figure 18:
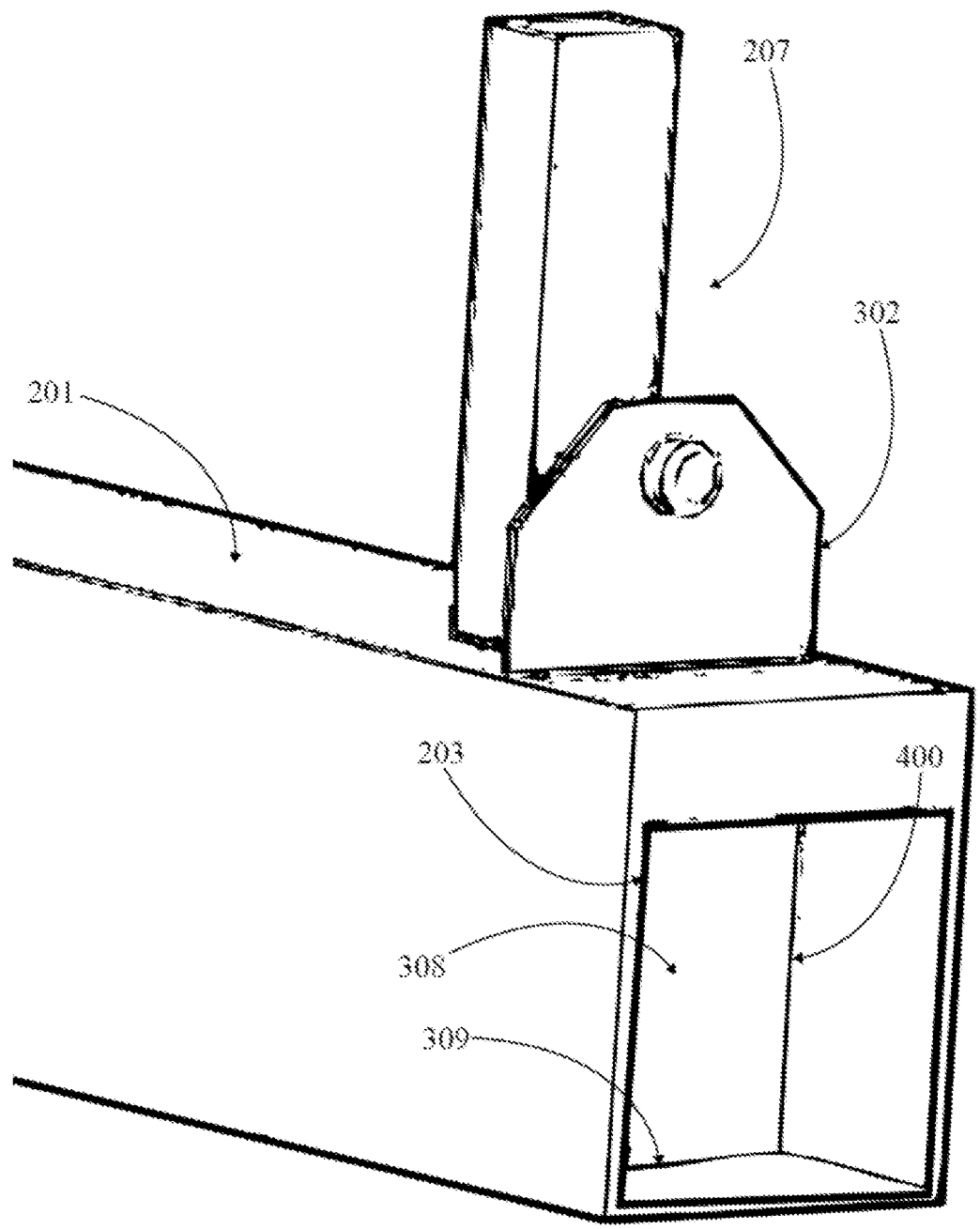
FIG. 18 is a detail perspective view of the die exit, wherein the cutting blade is positioned across the die exit.

A single iteration of the cutting process begins as shown in FIG. 18, wherein the material cutter 207 is in a 'closed' configuration with the sluice 308 fully obturating the sizing zone 201 and preventing any construction material from reaching the exit aperture 203.

Figure 19:
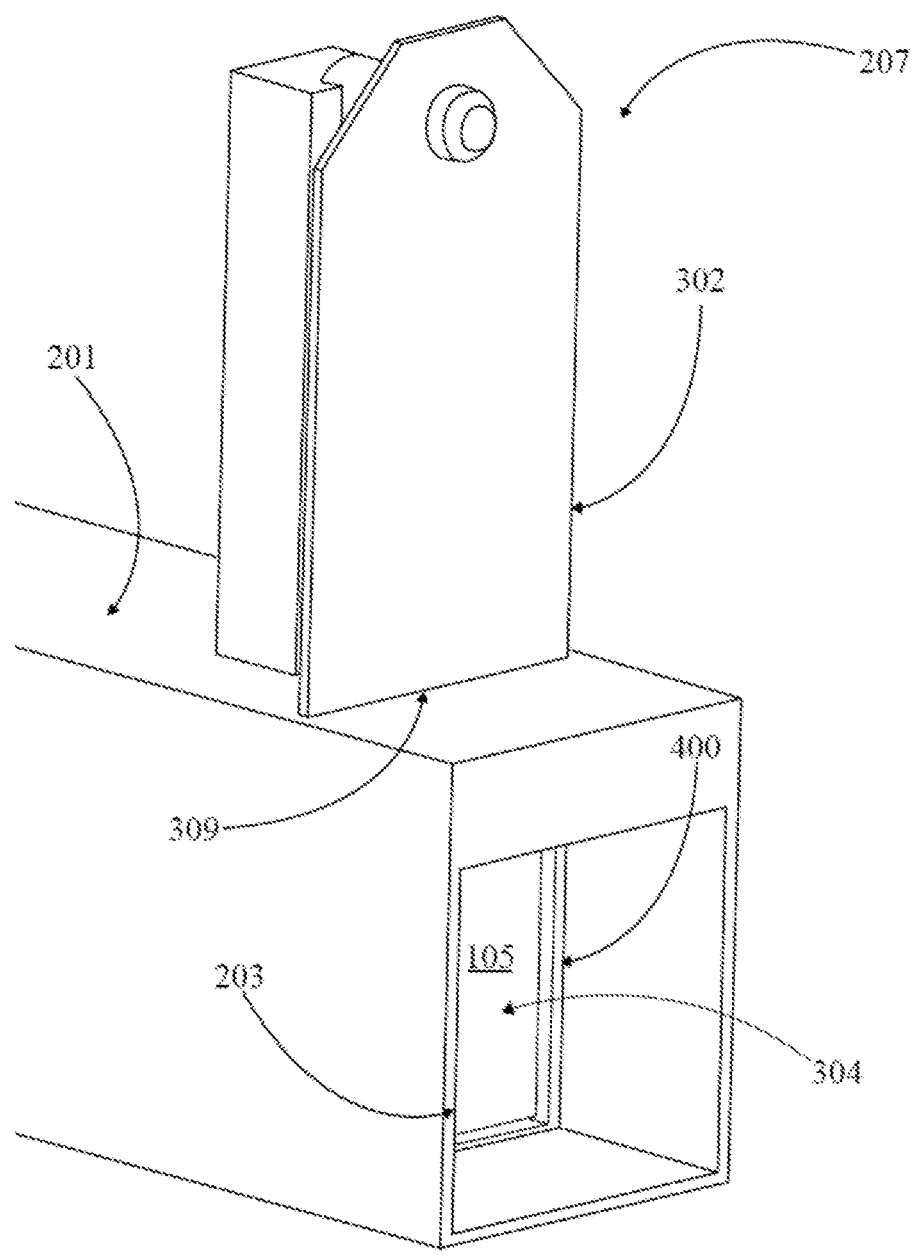
FIG. 19 is a view of the die exit, where the cutting blade is displaced from the die exit and the extrudate construction material is exposed.
Figure 20:
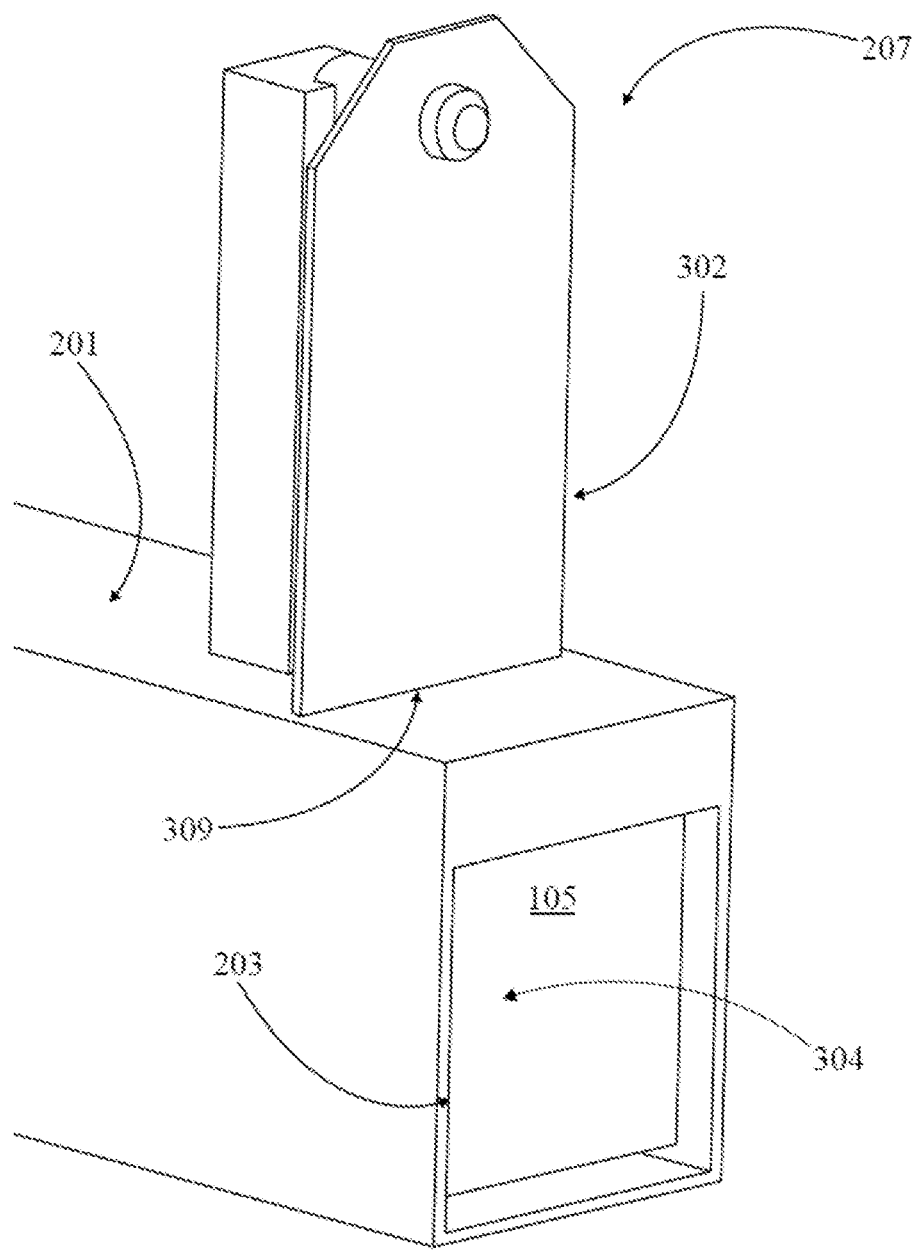
FIG. 20 is a view of the die exit, where the extrudate is advanced to the die exit past the cutting plane of the cutting blade.

The process continues as shown in FIG. 19, wherein the blade 302 is retracted along the cutting channel 400 and the segment of structured material 105 within the sizing zone 201 is released. It is during this time that the at least one actuator 108 is ideally operated to advance the piston 109, pressurize the compression zone 200, and force the segment of structured material 105 forward towards the exit aperture 203. Accordingly, the segment of structured material 105 traverses the cutting channel 400 towards the exit aperture 203 as shown in FIG. 20.

Figure 21:
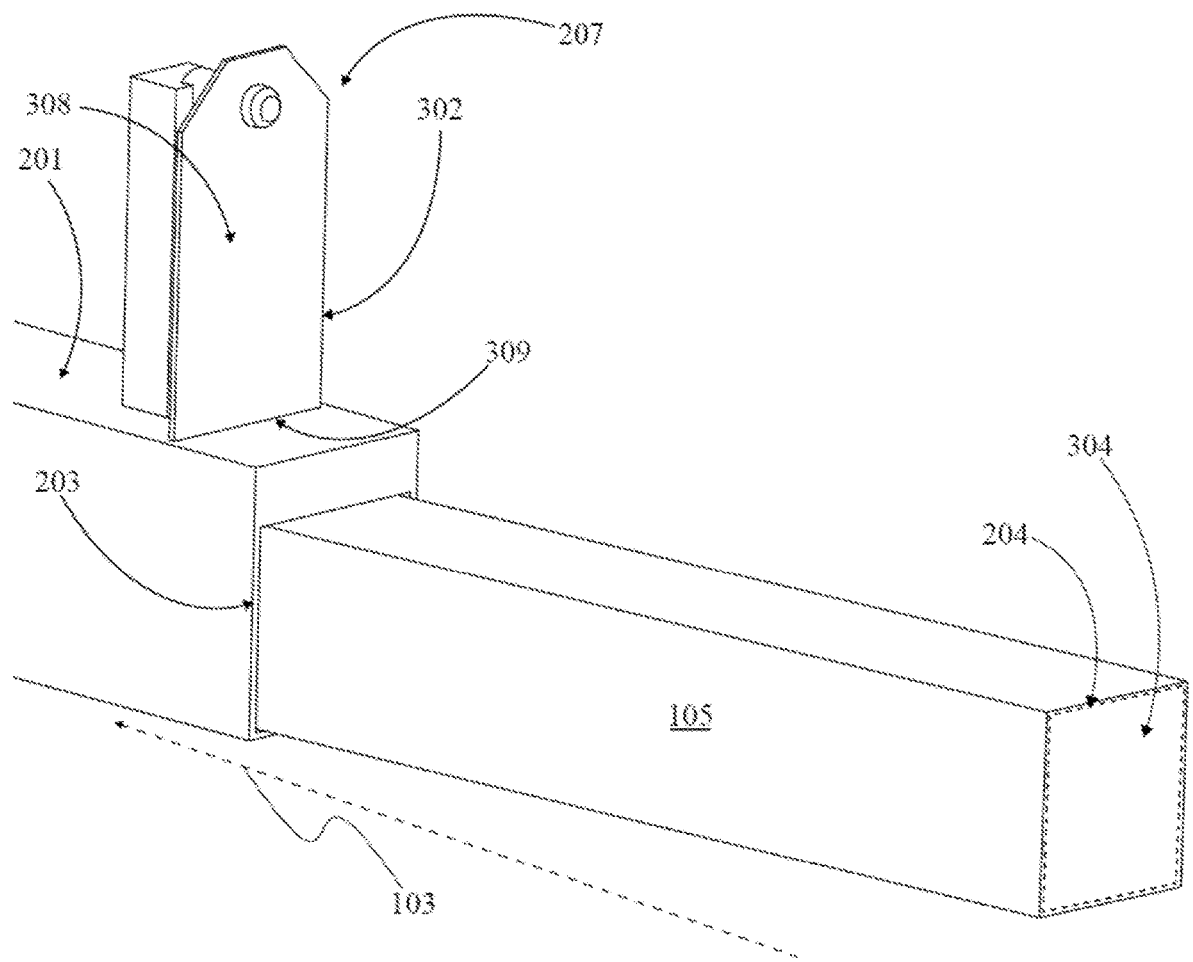
FIG. 21 illustrates the extrudate expressed from the die exit along the build surface.
Figure 22:
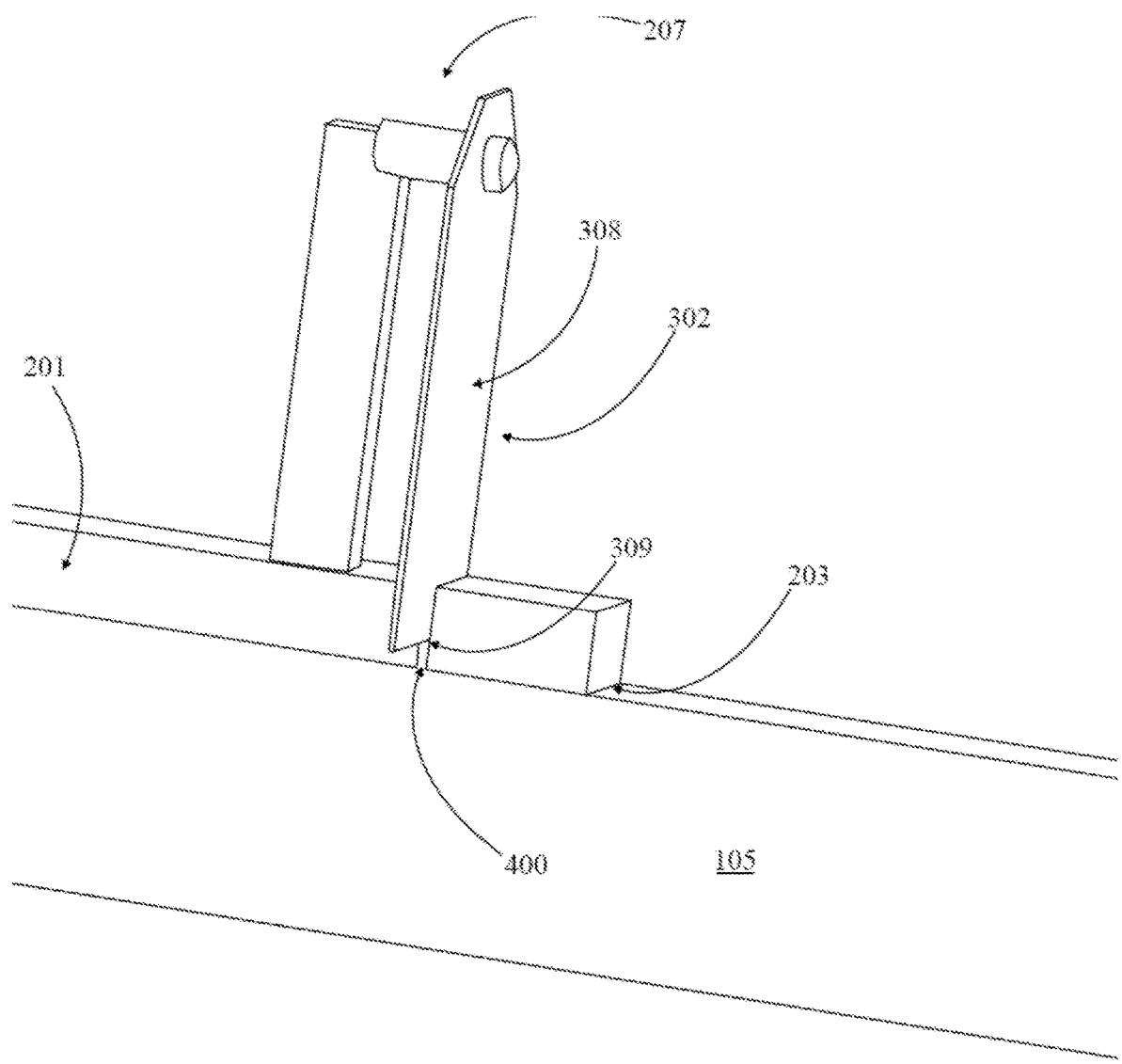
FIG. 22 illustrates operation of the cutting blade.

FIG. 21 illustrates an exemplary instance of the segment of structured material 105 being deposited along the deposition vector 103, with the blade 302 remaining clear of the sizing channel and allowing a continuous stream of construction material to traverse the sizing zone 201 and adopt the finished profile 204 defined by the exit aperture 203. FIG. 22 provides an additional cross-sectional view thereof, where the cutting element 309 of the blade 302 is being removed from the sizing zone 201.

Figure 23:
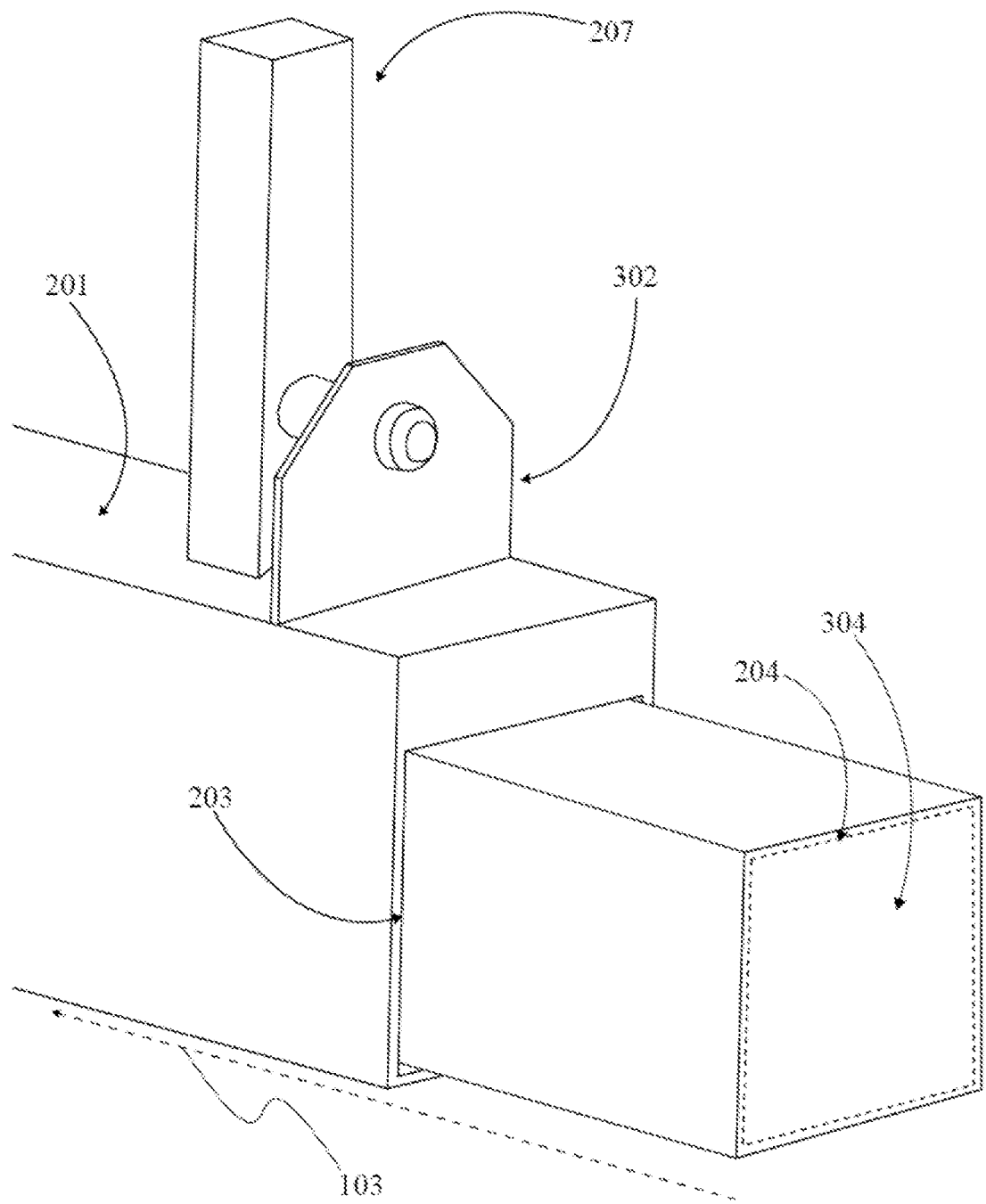
FIG. 23 shows the cutting blade positioned across the cutting plane, severing the construction material and blocking the die exit.
Figure 24:
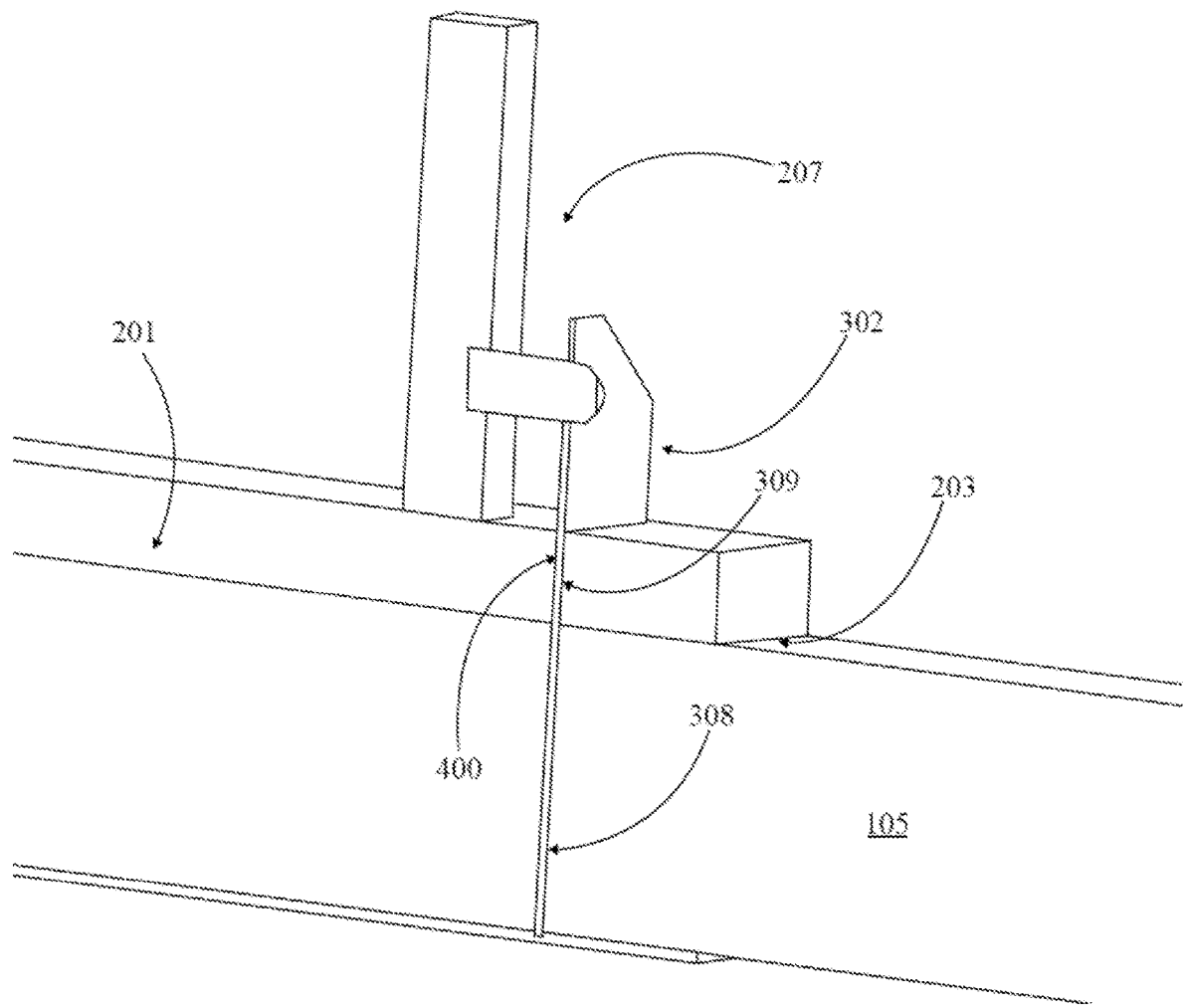
FIG. 24 shows the cutting plane and die exit.

FIG. 23 illustrates the termination of the segment of structured material 105, as the blade 302 is drawn through the segment of structured material 105 to create the terminal end 304 thereof. FIG. 24 provides a cross-sectional view thereof, as the sluice 308 is shown fully obturating the sizing zone 201 ahead of the exit aperture 203.

Figure 25:
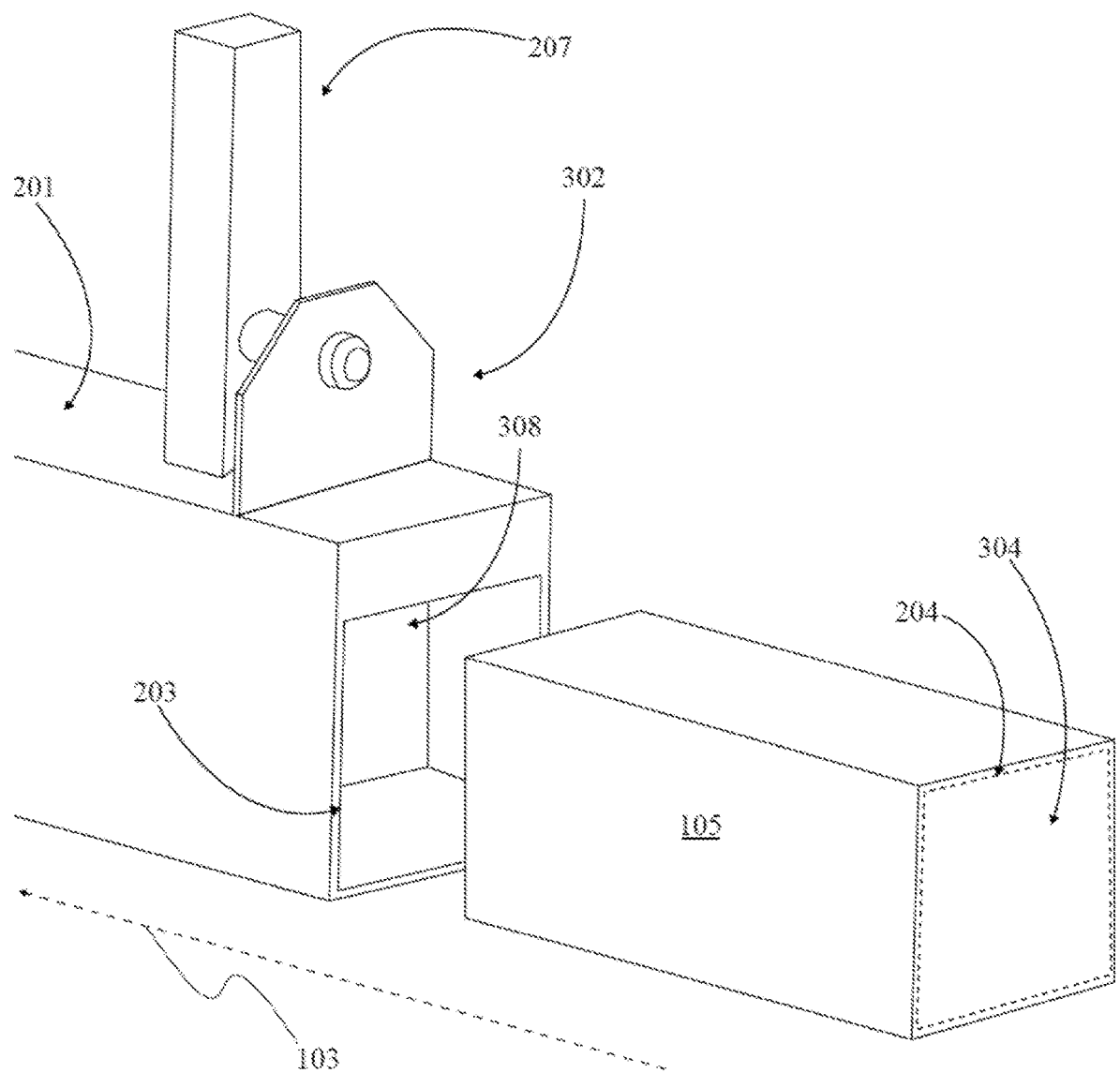
FIG. 25 shows the axial applied shaping system displaced from the extruded construction material on the build surface.
Figure 26:
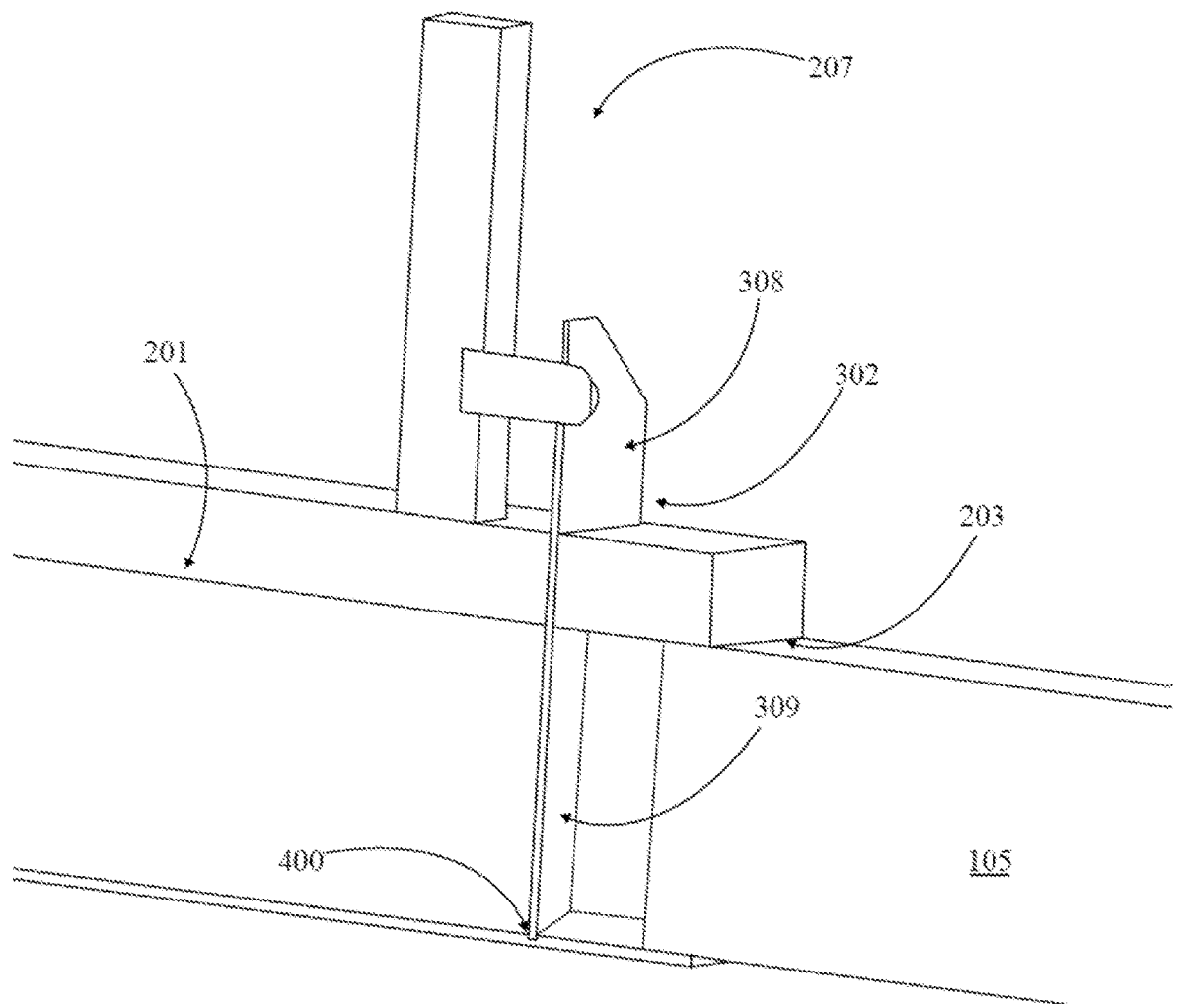
FIG. 26 shows the cutting plane and die exit.

FIG. 25 illustrates the forming mechanism 102 being drawn away from the deposited segment of structured material 105 remaining within the deposition vector 103, with a small portion of the construction material remaining within the sizing zone 201 after the material cutter 207 has fully severed the segment. FIG. 26 provides a cross-sectional view thereof, clearly indicating the retained dimensions of the terminal end 304 of the segment of structured material 105 post-cut.

A means of digitally assessing and self-correcting the finished profile 204 of the segment of structured material 105 is provided in a profile detector 402. The profile detector 402 ideally constitutes a laser-line scanner configured to detect the contours and dimensions of a physical object within a scanning range, i.e., the segment of structured material 105. However, across all conceivable embodiments, the profile detector 402 may constitute several commercially available systems employing lasers, optical cameras, ultrasonics, radar, X-ray or other non-contact or direct contact technologies to provide data to the unitary controller 104.

Figure 27:
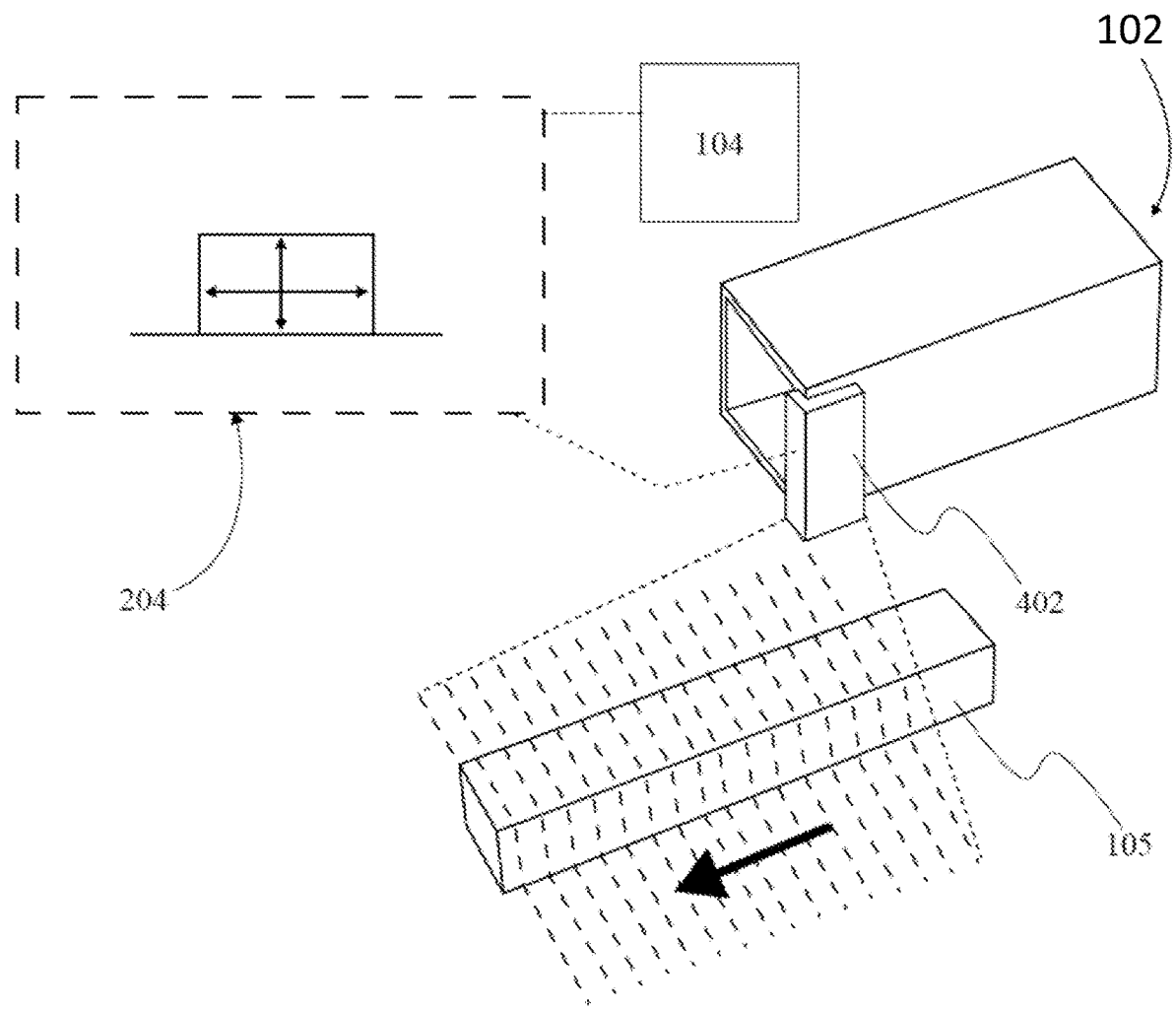
FIG. 27 is a composite perspective view of the extruded construction material being measured and rendered to machine-readable dimensions as part of the closed loop profile control system.

As shown in FIG. 27, the profile detector 402 is mounted to the forming mechanism 102 and oriented towards the segment of structured material 105 within the deposition vector 103. As the forming mechanism 102 extrudes the segment of structured material 105, the profile scanner detects the dimensions of the finished profile 204 and converts these dimensions into a machine-readable format. The profile detector 402 is further connected to the unitary controller 104 such that the observed dimensions of the finished profile 204 are periodically relayed to the unitary controller 104.

The unitary controller 104 is further configured to receive and interpret the digitized copy of the finished profile 204, whereby the unitary controller 104 may moderate the operation of the forming mechanism 102 and the carrier robot 100 to bring the finished profile 204 into compliance with a targeted profile 403. Pursuant to this function, the profile detector 402 may measure dimensional characteristics of width, height, and surface variation of the finished profile 204 at any given sample-rate.

Figure 28:
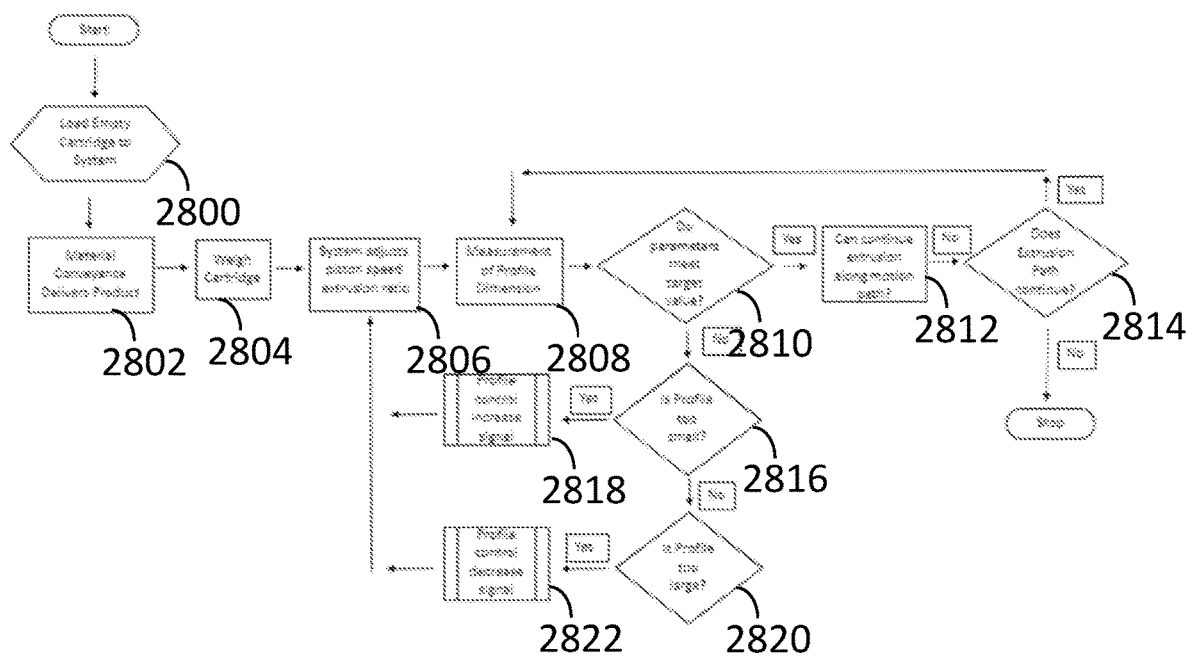
FIG. 28 is a decision tree of the closed loop profile control system representing an algorithm for actively moderating the terminal geometry of the extruded construction material.

FIG. 28 illustrates a closed loop control routine implemented by the unitary controller 104. An empty cartridge is loaded into the system 2800. Material is delivered to the cartridge 2802. The cartridge is weighed 2804. The system adjusts the piston speed to meet a specified extrusion ratio 2806. Material is deposited and the profile dimension is measured 2808. It is determined whether the measured parameters meet the target value 2810. If so (2810—Yes), it is determined if the extrusion path can be continued 2812. If the extrusion path continues (2814—Yes), control returns to block 2808. If not (2814—No) the process is stopped. If the measurement parameters are not met (2810—No), it is determined if the profile is too small 2816. If so (2816—Yes), the profile control signal is increased 2818 and control returns to block 2806. If not (2816—No) it is determined if the profile is too larger 2820. If so (2820—Yes), the profile control signal is decreased 2822 and control returns to block 2806.

The unitary controller 104, in turn, is used to continually adjust to an optimum extrusion rate to increase the volumetric output if the finished profile 204 is too small or decreases the volumetric output if the profile is too large in comparison to the ideal targeted profile 403. For example, the profile detector 402 may return a finished profile 204 that is below a desired build-height; this finished profile 204 indicates that the carrier robot 100 is advancing too quickly, or the forming mechanism 102 is extruding too slowly. In another instance, the finished profile 204 may be or buckled along the deposition vector 103; this indicates that the carrier robot 100 is advancing too slowly, or the forming mechanism 102 is extruding too quickly. Corrective measures are executed to both the motion control of the carrier robot 100 and the material control of the forming mechanism 102 via the unitary controller 104 based on this continuous feedback. This correction loop is ideally executed at 3 to 1000 corrections per second, dependent on the requisite fidelity to the targeted profile 403.

A method for consolidating the operation of the carrier robot 100 and the forming mechanism 102 into a coherent system is further provided herein. More specifically, the unitary controller 104 is provided with a means and method for automatically adjusting the motion-path of the carrier robot 100 according to the output rate of the forming mechanism 102 to prevent either system from operating outside of a mutually corresponding operational speed.

The process continues by receiving the deposition vector 103 from the unitary controller 104. The deposition vector 103 describes a single, complete operation executable by the carrier robot 100 and the forming mechanism 102 in tandem. Specifically, the deposition vector 103 defines a beginning point for a print-operation (inclusive of location coordinates and heading achievable by the carrier robot 100), and a desired output from the forming mechanism 102 (inclusive of volume and duration of extruded construction material). The deposition vector 103 is ideally received as an input from an external terminal or human-interface device as part of a larger build-plan comprising multiples of such vectors. Each successive build-layer is interwoven and overlaid to ultimately create a free-standing structure, i.e., a 3D-printed structural blueprint. In general, any instance of such a blueprint configured for use with the present invention contains a series of such vectors arranged for sequential execution by the unitary controller 104.

The process continues by resolving the deposition vector 103 into a displacement value 405 and an extrusion value 406. The displacement value 405 corresponds to the movement orders or motion-pathing executed by the carrier robot 100 during a single print-operation. Likewise, the extrusion value 406 defines a targeted output volume and rate for the forming mechanism 102, including expected expenditure of material along the deposition vector 103.

The process continues by displacing the forming mechanism 102 within the working volume 101 of the carrier robot 100 according to the displacement value 405. This physical displacement of the forming mechanism 102 within the working volume 101 enables the forming mechanism 102 to print on-the-move, thereby allowing a consistent slip-formed output to be laid into the working volume 101 via combined control of the extrusion rate and the displacement rate.

Accordingly, the process continues by extruding the segment of structured material 105 onto a selected build surface 106 along the deposition vector 103 with the forming mechanism 102 according to the extrusion value 406. According to the outlined description of the printable 'blueprint', it is contemplated that the selected build surface 106 is, in at least one instance, a previous build-layer laid into the working volume 101. Accordingly, the consistency afforded to the segments of structured material is leveraged to create repeatable structural elements and automatically position these elements according to a digital plan.

Per the outline building process, the proposed method concludes after executing a plurality of iterations, where the deposition vector 103 is updated. Each updated instance of the deposition vector 103 is ideally pre-arranged to account for previous build-layers comprising multiple instances of the segment of structured material 105. It is therefore understood that the repetition of the above-described method is performed based on a continuous stream of unique instances of the deposition vector 103 received by the unitary controller 104 in sequence.

It is further contemplated that the proposed method benefits from a means of detecting and self-correcting errors in the printing process, both as a means of optimizing current output and also preventing cumulative errors later in the build-process. Accordingly, a subprocess of the proposed method begins by defining a targeted profile 403 within the unitary controller 104. The targeted profile 403 generally defines an ideal range of height, width, and surface qualities of the segment of structured material 105 deposited into the working volume 101. The thresholds for this range, or ranges, are understood to be variable according to the requisite fidelity to a nominal value in any given application of the present invention.

The process continues by retrieving the finished profile 204 of the segment of structured material 105 with the profile detector 402, wherein the finished profile 204 contains as-built metrics corresponding to the values defined by the targeted profile 403. Ideally, each datum contained within the finished profile 204 has a direct counterpart datum within the targeted profile 403, enabling rapid comparisons between the two data sets.

Accordingly, the process continues by deriving a profile correction value 408 from the difference between the finished profile 204 and the targeted profile 403 defined by the unitary controller 104. The type of profile correction value 408 derived is dependent upon the type of deviation detected and the current operating metrics of the present invention expressed as thresholds across an ideal value.

Once the profile correction value 408 is determined, the subprocess concludes by moderating the operation of the carrier robot 100 and the forming mechanism 102 according to the profile correction value 408. For example, if the finished profile 204 is substantially thinner than the targeted profile 403, the profile correction value 408 may constitute a speed reduction for the carrier robot 100 to avoid 'stringing' the segment of structured material 105. Alternatively, if the forming mechanism 102 may be safely operated as a higher extrusion-rate, the profile correction value 408 may constitute an increase in the extrusion speed of the forming mechanism 102 to 'catch up' to the carrier robot 100.

Figure 29:
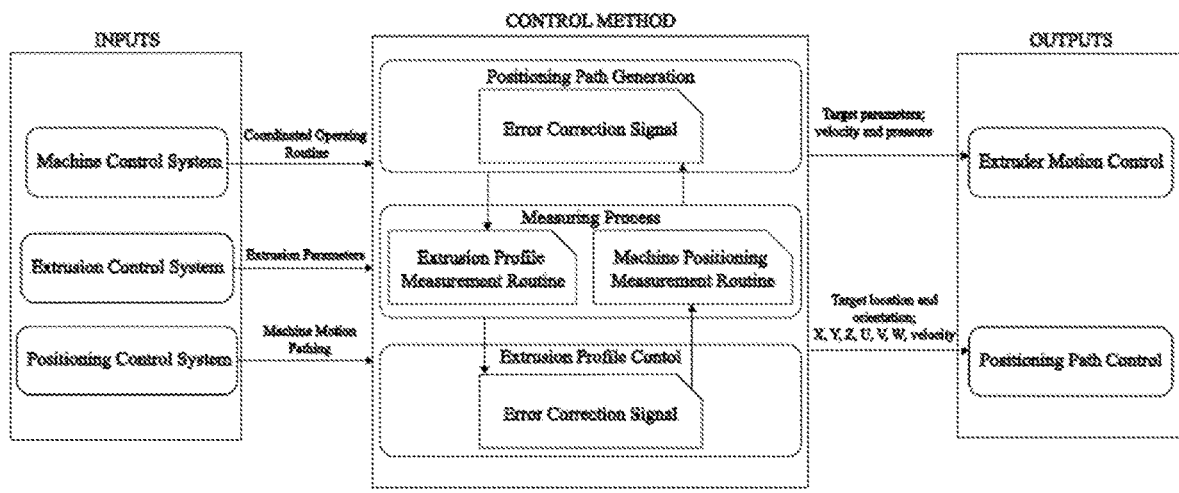
FIG. 29 is a schematic view of an exemplary data-sharing arrangement enabling the Cartesian robot and the closed loop profile control system to integrate to a unitary control system.

FIG. 29 illustrates a control method, such as implemented by the unitary controller 104. Inputs include a machine control system that provides coordinated operating signals. An extrusion control system supplies extrusion parameter. A positioning control system provides machine motion path signals. A positioning path control block supplies an error correction signal. A measuring control block processes extrusion profile measurement signals and machine positioning measurement signals in connection with extrusion profile control signals. Velocity and pressure signals are applied to an extruder motion controller. Target location and orientation signals are applied to a positioning path controller.

Figure 30:
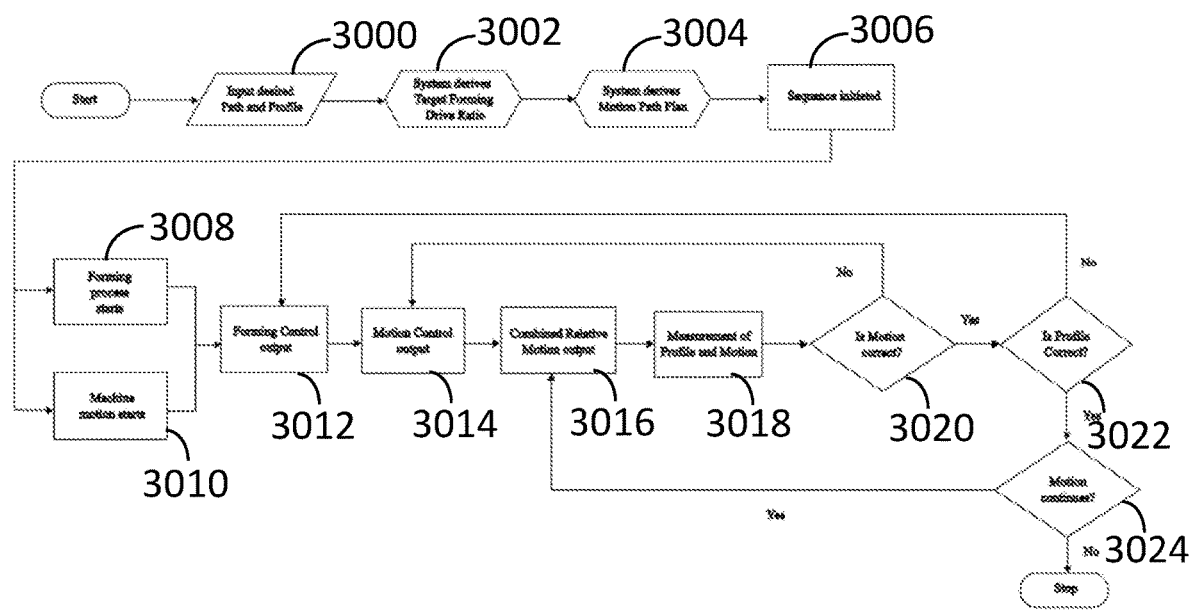
FIG. 30 is an exemplary logic tree outlining a process for synchronizing the operating speeds of a Cartesian robot and the operation of a construction material extruder.

FIG. 30 illustrates another control methodology that may be utilized by the unitary controller 104. A user specifies a desired path and profile 3000. The unitary controller derives a target forming drive ratio 3002 and a motion path plan 3004 and the sequence is initiated 3006. In particular, the forming process starts 3008 and machine motion starts 3010. Material forming control signals are executed 3012. Motion control signals are executed 3014. This results in combined relative motion output 3016. The deposit profile and motion are measured 3018. These measurements are compared with the derived plan. It is determined if the motion is correct 3020. If not (3020—No), control returns to the motion control stage 3014. If motion is correct (3020—Yes), it is determined if the profile is correct 3022. If not (3022—No), control returns to motion control stage 3012. If so (3022—Yes), it is determined if motion should continue 3024. If so (3024—Yes), control returns to block 3016. If not (3024—No), the process is stopped.

Although the invention has been explained in relation to its preferred embodiment and best-method, including several branching permutations thereof, it is to be understood that many other possible modifications and variations can be made without departing from the original spirit and scope of the present invention.

The invention claimed is:

1. An apparatus comprising:
 a carrier robot operative within a working volume;
 a forming mechanism mounted to the carrier robot, the forming mechanism including:
  an actuator, a piston, a compression zone, and a sizing zone;
  the actuator being operably positioned into the compression zone;
  the piston being connected to the at least one actuator, such that a volume of unstructured material within the compression zone is conveyed into the sizing zone ahead of the piston;
  the sizing zone terminating at an exit aperture, such that the exit aperture defines a finished profile of the segment of structured material, wherein the sizing zone further comprises a vertical conduit, a deviated conduit, and a horizontal conduit; the vertical conduit being adjacent to the compression zone; the vertical conduit being in fluid communication with the horizontal conduit through the deviated conduit, such that the deviated conduit deflects from the vertical conduit; and the horizontal conduit is oriented coaxially with the deposition vector;
 a material cutter being positioned within the sizing zone, such that a blade is operably positioned through the segment of structured material within the sizing zone, wherein the blade has a sluice and a cutting element; the sluice being slidably engaged into a cutting channel within the sizing zone, such that the sluice selectably obturates the sizing zone; the cutting element being terminally connected to the sluice, such that the cutting element severs the segment of structured material within the sizing zone; and
 a unitary controller supplying control signals to the carrier robot and the forming mechanism, such that the carrier robot implements mechanical motion along a deposition vector and the forming mechanism deposits a segment of structured material onto a build surface within the working volume.

2. The apparatus of claim 1 wherein the sizing zone extends from the compression zone to the exit aperture and a cross-sectional dimension of the sizing zone decreases towards the exit aperture.

3. The apparatus of claim 1 wherein the blade is offset from the exit aperture within the sizing zone, such that a terminal end of the segment of structured material retains the finished profile defined by the exit aperture.

4. The apparatus of claim 1 wherein the blade has a non-planar formation, such that the terminal end of the segment of structured material conforms to the non-planar formation.

5. The apparatus of claim 1 further comprising:
 a profile detector being mounted to the forming mechanism;
 the profile detector being oriented towards the segment of structured material within the deposition vector;

the profile detector receiving the dimensions of the finished profile;

the profile detector being communicably coupled to the unitary controller to relay the dimensions of the finished profile; and the unitary controller modulating the operation of the forming mechanism and the carrier robot, such that the finished profile matches a targeted profile.

\* \* \* \* \*